(12) United States Patent
Kaneda et al.

(10) Patent No.: US 10,156,915 B2
(45) Date of Patent: Dec. 18, 2018

(54) POSITION POINTING DEVICE AND CORE BODY FOR POSITION POINTING DEVICE

(71) Applicant: Wacom Co., Ltd., Saitama (JP)

(72) Inventors: Takenori Kaneda, Tochigi (JP); Takayuki Arai, I, Saitama (JP); Mamoru Ogata, Saitama (JP); Shinya Aoki, Saitama (JP)

(73) Assignee: Wacom Co., LTD., Saitama (JP)

( * ) Notice: Subject to any disclaimer, the term of this patent is extended or adjusted under 35 U.S.C. 154(b) by 466 days.

(21) Appl. No.: 14/761,928

(22) PCT Filed: May 20, 2014

(86) PCT No.: PCT/JP2014/063292
§ 371 (c)(1),
(2) Date: Jul. 17, 2015

(87) PCT Pub. No.: WO2014/203670
PCT Pub. Date: Dec. 24, 2014

(65) Prior Publication Data
US 2016/0018912 A1    Jan. 21, 2016

(30) Foreign Application Priority Data

Jun. 20, 2013  (JP) .................................. 2013-129840
Feb. 13, 2014  (JP) .................................. 2014-025150

(51) Int. Cl.
*G06F 3/0354* (2013.01)
*G06F 3/033* (2013.01)

(52) U.S. Cl.
CPC .......... *G06F 3/03545* (2013.01); *G06F 3/033* (2013.01)

(58) Field of Classification Search
CPC .............................. G06F 3/041; G06F 3/03545
(Continued)

(56) References Cited

U.S. PATENT DOCUMENTS 5,565,632 A * 10/1996 Ogawa ................ G06F 3/03545
                                              73/862.041
6,384,814 B1 * 5/2002 Kobayashi ............ G06F 3/0433
                                              345/173

(Continued)

FOREIGN PATENT DOCUMENTS

EP         1983408 A2 * 10/2008 ......... G06F 3/03545
JP     2005-010844 A     1/2005

(Continued)

OTHER PUBLICATIONS

International Search Report, dated Aug. 12, 2014, issued in corresponding International Application No. PCT/JP2014/063292, filed May 20, 2014, 2 pages.

*Primary Examiner* — Stacy Khoo
(74) *Attorney, Agent, or Firm* — Seed IP Law Group LLP

(57) ABSTRACT

A position pointing device includes a pressure detecting part which detects a pressure applied in an axial direction of a core body. The core body includes: a leading end part formed from an elastic material; a pedestal part which is formed from a material harder than the material of the leading end part and is joined to the leading end part; and a core body main body part which is joined to the pedestal part, is smaller than the pedestal part in thickness in a direction orthogonal to the axial direction, and is formed from a hard material. The core body is housed in a casing and is movable in the axial direction, such that the leading end part is exposed via an opening of the casing, and a pressure exerted on the leading end part in the axial direction is transmitted to the pressure detecting part.

22 Claims, 16 Drawing Sheets

(58) Field of Classification Search
USPC .................... 345/173–179; 178/18.01–18.09
See application file for complete search history.

(56) References Cited

U.S. PATENT DOCUMENTS

| | | | |
|---|---|---|---|
| 7,149,647 | B2 | 12/2006 | Katsurahira |
| 8,063,322 | B2 | 11/2011 | Katsurahira |
| 8,674,967 | B2 * | 3/2014 | Fukushima ............ G01D 5/208 |
| | | | 178/19.03 |
| 8,913,041 | B2 | 12/2014 | Fukushima et al. |
| 2003/0122795 | A1 * | 7/2003 | Fujitsuka ............ G06F 3/03545 |
| | | | 345/173 |
| 2005/0043918 | A1 | 2/2005 | Katsurahira |
| 2006/0239761 | A1 * | 10/2006 | Cetera .................... B43K 24/02 |
| | | | 401/258 |
| 2008/0257613 | A1 | 10/2008 | Katsurahira |
| 2011/0219892 | A1 | 9/2011 | Fukushima et al. |
| 2011/0241703 | A1 * | 10/2011 | Fukushima ......... G06F 3/03545 |
| | | | 324/662 |

FOREIGN PATENT DOCUMENTS

| | | |
|---|---|---|
| JP | 2007-164356 A | 6/2007 |
| JP | 2008-269244 A | 11/2008 |
| JP | 2010-129920 A | 6/2010 |
| JP | 2011-186803 A | 9/2011 |

* cited by examiner

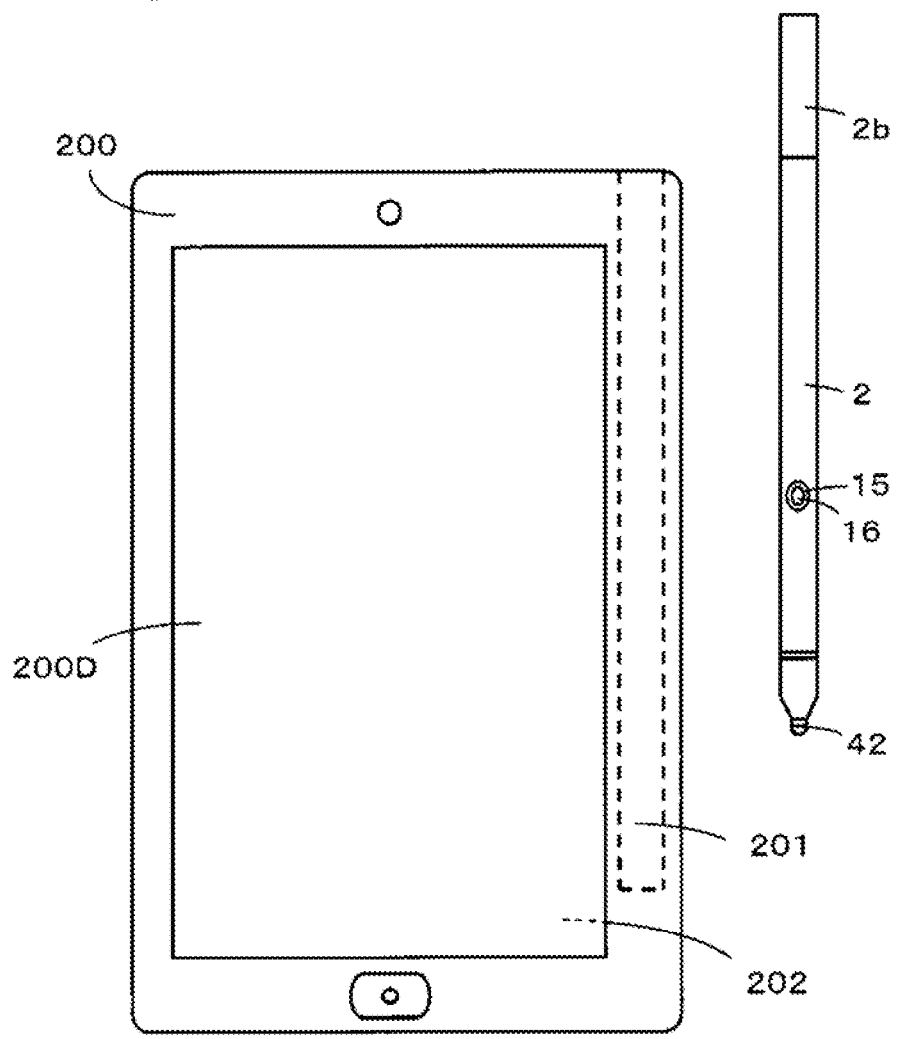

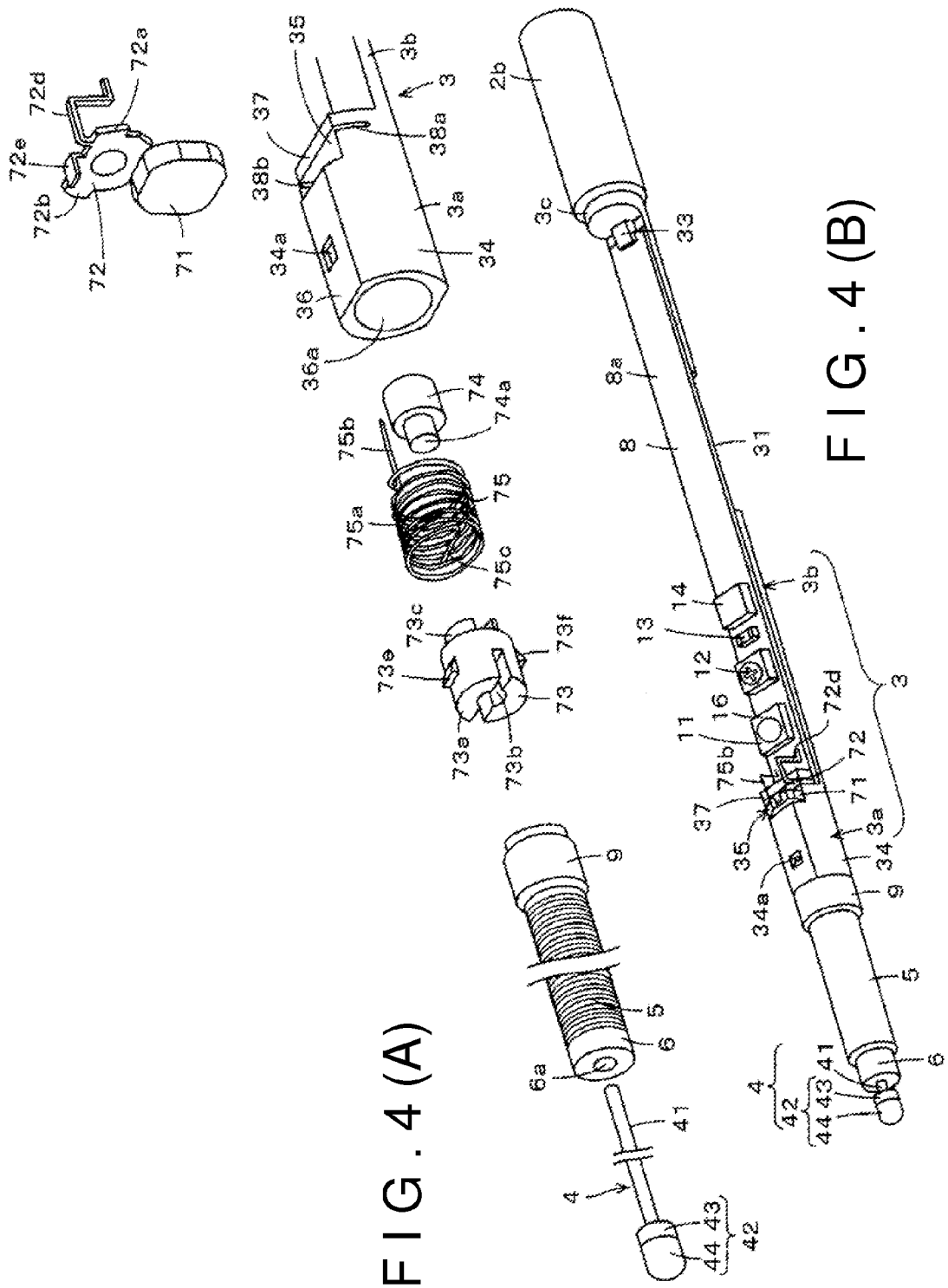

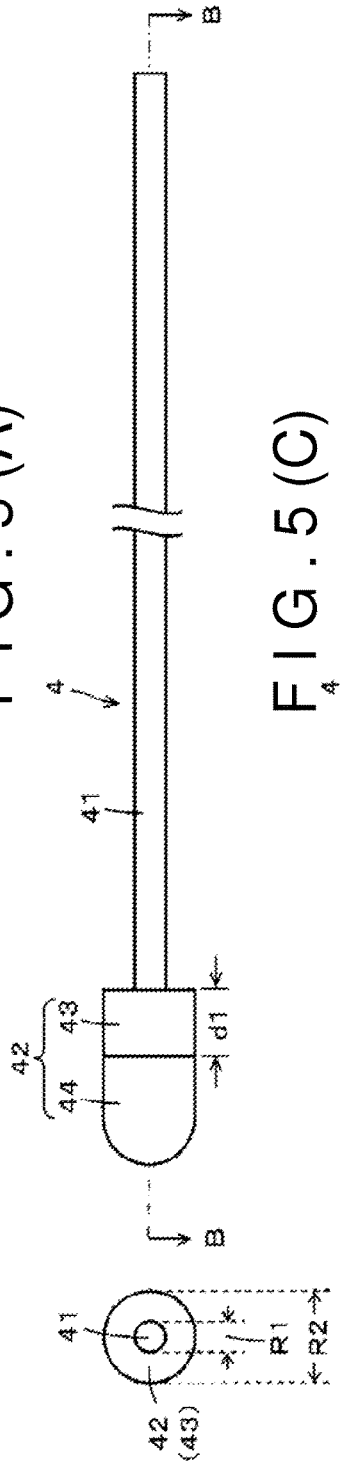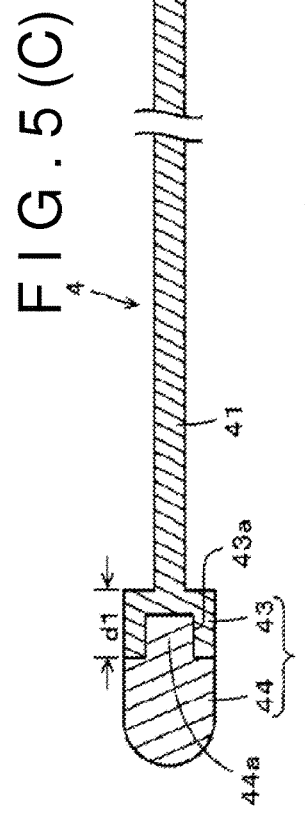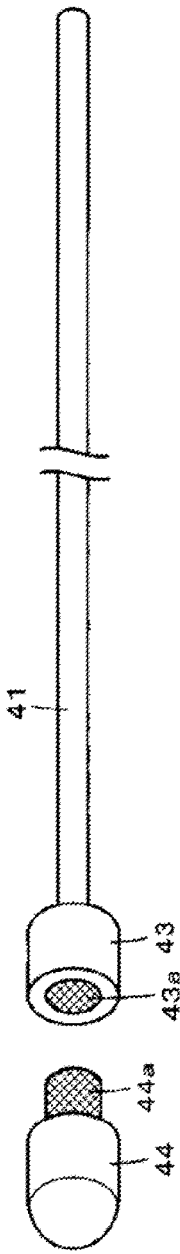

POSITION POINTING DEVICE AND CORE BODY FOR POSITION POINTING DEVICE

TECHNICAL FIELD

The present disclosure relates to a position pointing device having, for example, a pen-like shape, that is used with a position detecting device. Particularly, the disclosure relates to the configuration of a core body in a position pointing device which has a function to detect a pressure (writing pressure) exerted on a leading end part (pen point) of the core body.

BACKGROUND ART

In recent years, position input apparatuses have been used as input devices for tablet type personal computers (PCs) and the like. A position input apparatus includes a position pointing device which is formed, for example, to be of a pen type, and a position detecting device having an input surface on which a pointing operation and inputting of characters, figures or the like are conducted using the position pointing device.

As a pen-type position pointing device of this kind, conventionally, those for use with a position detecting device based on an electromagnetic induction system have been widely known. The position pointing device of the electromagnetic induction system has a resonance circuit configured by connecting a resonant capacitor to a coil wound around a magnetic-material core, for example, a ferrite core. The position pointing device transmits a resonance signal, obtained by the resonance circuit, to the position detecting device, thereby pointing a position to the position detecting device.

In addition, the pen type position pointing device of this kind has conventionally been configured to have a function to detect a pressure (writing pressure) exerted on the leading end part (pen point) of the core body and to transmit the pressure to the position detecting device. In this case, for detection of the writing pressure, there has been known a method of using a mechanism by which the capacitance of a capacitor constituting the resonance circuit or the inductance of a coil constituting the resonance circuit is varied according to the writing pressure.

FIG. 18 illustrates a configuration example of a conventional position pointing device including a writing pressure detection module of a variable capacitor type wherein the capacitance of a capacitor constituting a resonance circuit of the position pointing device is varied according to the writing pressure. This example of position pointing device is described in Patent Document 1 (Japanese Patent Laid-Open No. 2011-186803). FIG. 18 is a longitudinal sectional view for explaining the configuration example of the position pointing device.

As shown in FIG. 18, a position pointing device 100 includes a core body 102, a position pointing coil 104 wound around a ferrite core 103, a variable capacitor 105, and a printed circuit board 106, which are disposed inside a tubular casing (case) 101.

The casing 101 is in a cylindrical shape, having an opening 101a on one end in the axial direction and closed on the other end in the axial direction. In a position near the other end in the axial direction inside a cylindrical cavity of the casing 101, the printed circuit board 106 with electronic components mounted thereon is fixed by securing means such as adhesive or screw. The ferrite core 103 is housed in the casing 101 in a position near the one end where the opening 101a is formed.

The ferrite core 103 is in the shape of, for example, a circular cylinder provided therein with a penetration hole 103a in the axial direction, and the position pointing coil 104 constituting a resonance circuit is wound on the periphery of the ferrite core 103. Both ends (not shown) of the position pointing coil 104 are electrically connected to electronic components constituting the resonance circuit which is mounted on the printed circuit board 106. The core body 102 is inserted in and extends through the penetration hole 103a of the ferrite core 103.

The core body 102 is a bar-shaped member having a substantially constant thickness (radial size), and is formed of an elastic material so as not to mar an input surface composed of a glass surface or the like. One end in the axial direction of the core body 102 is a leading end part 102a serving as a pen point. In the example depicted in FIG. 18, the one end is formed in a roughly conical shape. When the core body 102 is housed inside the casing 101 by inserting it in the penetration hole 103a of the ferrite core 103, the one end protrudes from the opening 101a to be exposed to the exterior. Other end 102b in the axial direction of the core body 102 is connected to the variable capacitor 105.

Because the leading end part 102a is brought into contact with a display screen or the like, the core body 102 is formed of, for example, an elastic resin such as not to mar the display screen or the like.

Although a detailed drawing is omitted in FIG. 18, the variable capacitor 105 has a configuration wherein a first electrode and a second electrode are arrayed in the axial direction, with a circular disc-shaped dielectric interposed therebetween. The second electrode is preliminarily attached to a flat surface, on the printed circuit board 106 side, of the dielectric. The first electrode is composed of a conductor which is formed of an elastic material and a tip surface of which is in a spindle-like shape. The first electrode is provided on the core body 102 side, with its spindle-like tip surface opposed to the dielectric. The other end 102b side of the core body 102 is connected to the conductor constituting the first electrode.

When a pressure in the axial direction is exerted on the leading end part 102a of the core body 102, the conductor formed of the elastic material constituting the first electrode is pressed against the dielectric by the pressure, whereby the conductor is elastically deformed, and the area of contact between the dielectric and the conductor is varied. The variable capacitor 105 exhibits a capacitance according to the area of contact. In other words, the variable capacitor 105 has a capacitance according to the pressure exerted on the core body 102. Since the variable capacitor 105 constitutes part of the resonance circuit, by transmitting the resonance frequency of the resonance circuit from the position pointing device 100 to the position detecting device side, the writing pressure exerted on the core body 102 of the position pointing device 100 can be detected on the side of the position detecting device.

PRIOR ART DOCUMENT

Patent Document

Patent Document 1: Japanese Patent Laid-Open No. 2011-186803

SUMMARY OF INVENTION

Technical Problems

The position pointing device 100 as described above has been formed to be comparatively large in thickness (radial size), without any limitation as to thickness (radial size). Therefore, the core body 102 is composed of a comparatively thick (radially large) bar-shaped resin member having a substantially constant diameter, over the range from the leading end part 102a to the other end 102b connected to the variable capacitor. Since the core body 102 is comparatively thick (radially large), it can transmit the writing pressure to the variable capacitor 105 even when formed of an elastic material.

Recently, however, in using a small-type portable apparatus such as high-function portable telephone terminals called smartphones, a touch panel (touch sensor) has come to be used in the state of being superposed on the display screen, and a position pointing device has, in some cases, been used as input means therefor. This kind of portable apparatus is configured to be small and thin. Therefore, there has been a demand for position pointing devices smaller in thickness (radial size).

As the position pointing device becomes smaller in thickness (radial size), the ferrite core 103 also becomes smaller in thickness (radial size). Therefore, the penetration hole 103a of the ferrite core 103 also becomes smaller in radial size or diameter. Then, it is necessary to reduce the core body 102 in thickness (radial size). Where a bar-shaped core body formed of an elastic material as in the related art is used, therefore, the core body may be insufficient in strength and unsuitable for transmitting the writing pressure to the variable capacitor.

In view of this, it has been proposed to form the core body from a hard material such as a metal or rigid resin so that the core body has a sufficient strength and can transmit the writing pressure, exerted on the core body, to a pressure detecting part in a reliable manner.

In this case, if the leading end part is also formed of the same hard material, there arises a risk that a display screen or the like may be marred by the hard leading end part. In view of this, it has been proposed, as illustrated in FIG. 19(A), to divide the core body 110 into a leading end part 111 brought into contact with an input surface such as a display screen and a core body main body part 112, to form the leading end part 111 of an elastic material more flexible than the core body main body part 112, and to form the core body main body part 112 of a hard material such as a metal or rigid resin.

It is also proposed to provide the leading end part 111 formed of the elastic material with a recess hole 111a in the axial direction in which to fit the core body main body part 112, to press fit one end of the core body main body part 112 into the recess hole 111a as shown in FIG. 19(B), and to adhere the one end to the recess hole 111a, thereby configuring the core body 110.

In this case, however, the following problem arises. In the case of the configuration shown in FIGS. 19(A) and 19(B), to the core body main body part 112 formed of a hard material, the leading end part 111 formed of a material softer than the core body main body part 112 is connected, so that the affinity between them is poor. Moreover, a joint between the core body main body part 112 and the leading end part 111 is only at the inner wall surface of the recess hole 112a where the thin (radially small) core body main body part 112 fits to the leading end part 111. Consequently, the joint area is very small, since the core body main body part 112 is small in thickness (radial size).

Thus, the affinity between the core body main body part 112 and the leading end part 111 is poor, and the area of the joint between the leading end part 111 and the core body main body part 112 is small. Therefore, the joint strength between the leading end part 111 and the core body main body part 112 is low, and, accordingly, there is a fear that the leading end part 111 may come off (be detached from) the core body main body part 112 during use of the position pointing device. If the leading end part 111 comes off, there is a possibility that the hard core body main body part 112 formed of metal or the like mars the input surface contacted by the leading end part of the position pointing device, such as a glass surface of a display screen.

It is an object of the present disclosure to provide a position pointing device and a core body for a position pointing device by which the aforementioned problematic points can be improved.

Technical Solution

In order to solve the aforementioned problems, there is provided a position pointing device including:

a core body;

a tubular casing provided, on one end in an axial direction thereof, with an opening via which one end in an axial direction of the core body is exposed to an exterior; and a pressure detecting part which is provided inside the tubular casing and which, in operation, detects a pressure applied in the axial direction of the core body;

wherein the core body includes a leading end part formed of an elastic material, a pedestal part formed of a material which is different from the elastic material of the leading end part and is harder than the elastic material of the leading end part, the pedestal part being joined to the leading end part in the axial direction of the core body, and a core body main body part joined to the pedestal part in the axial direction of the core body, a thickness of the core body main body part being smaller than a thickness of the pedestal part in a direction orthogonal to the axial direction; and the core body is housed in the casing in a state of being movable in the axial direction, such that the leading end part is exposed to the exterior via the opening of the casing and that a pressure exerted on the leading end part in the axial direction is transmitted to the pressure detecting part provided on an opposite side of the core body main body part from the pedestal part.

The core body of the position pointing device includes the leading end part formed of the elastic material, the pedestal part formed of the material harder than the elastic material forming the leading end part, and the core body main body part smaller than the pedestal part in thickness (radial size) and formed of a hard material. The core body main body part is connected to the pedestal part greater than the core body main body part in thickness (radial size), and the leading end part of the core body is joined to the pedestal part.

The core body main body part, though small in thickness (radial size), is connected to the pedestal part formed of a material which is harder than the leading end part and is therefore high in affinity for the core body main body part. Therefore, the pedestal part is securely joined to the core body main body part. Particularly, as described in claim 4, the core body main body part and the pedestal part can be configured to be integral, and, in that case, there is no possibility of detachment of the pedestal part from the core body main body part.

Since the pedestal part is greater than the core body main body part in thickness (radial size), the total surface area (joint area) of the joint portion between the pedestal part and the leading end part upon joining of them is large, so that the leading end part is securely fixed to the pedestal part. Accordingly, the problem of detachment of the leading end part from the pedestal part during use of the position pointing device can be avoided.

Advantageous Effect

According to the position pointing device of the present disclosure, owing to the presence of the pedestal part, the problem of detachment of the leading end part during use of the position pointing device can be obviated, even where the core body main body part of the core body is thin (radially small).

BRIEF DESCRIPTION OF DRAWINGS

FIG. 2 is a plan view of the position pointing device and an electronic apparatus including a position detecting device to be used with the position pointing device.

FIGS. 4(A) and 4(B) are exploded perspective views of part of the position pointing device according to the first embodiment.

FIG. 5(A) is a plan view of a core body the position pointing device according to the first embodiment, FIG. 5(B) is a side view of a protruding member of the core body, FIG. 5(C) is a sectional view of the core body taken along line B-B in FIG. 5(A), and FIG. 5(D) is an exploded view of the core body.

MODES FOR CARRYING OUT THE INVENTION

Figure 1A:
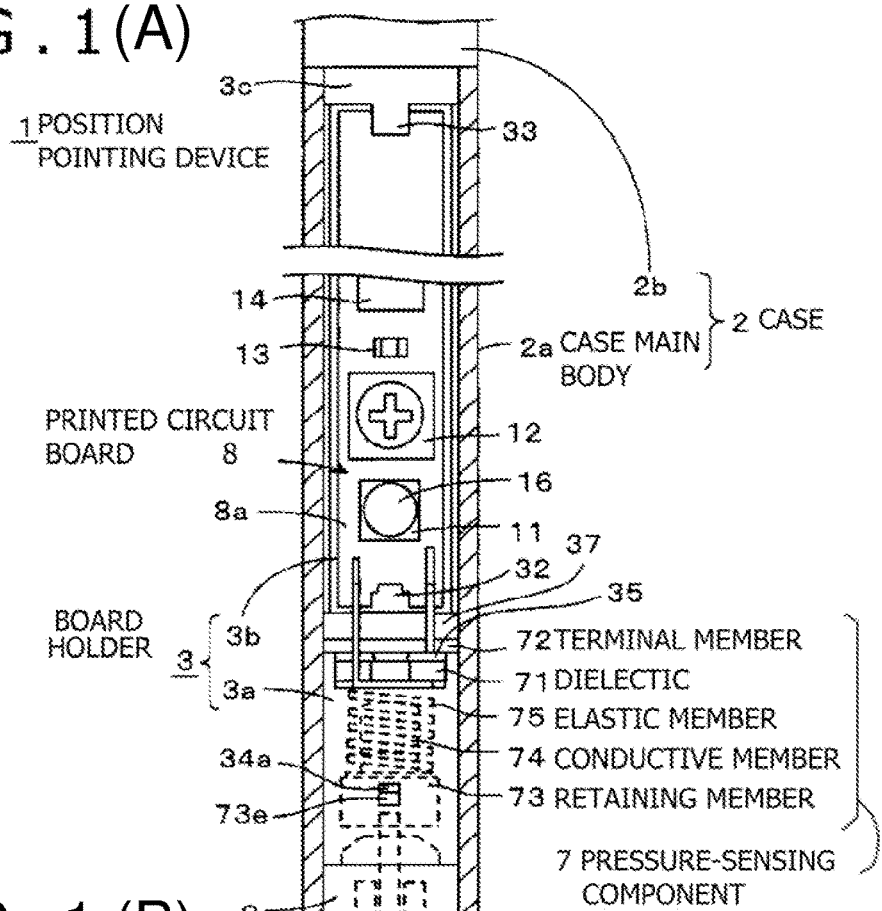
FIGS. 1(A) and 1(B) are sectional views of a first embodiment of a position pointing device according to the present disclosure.

Some embodiments of a position pointing device according to the present disclosure will be described below, referring to the drawings.

[First Embodiment]

FIGS. 1 to 5 show views for explaining a configuration example of the position pointing device according to the first embodiment of the present disclosure. FIG. 2 illustrates an example of an electronic apparatus 200 with which to use a position pointing device 1 according to the first embodiment. In this example, the electronic apparatus 200 is a high-function portable telephone terminal provided with a display screen 200D of a display device such as, for example, a liquid crystal display (LCD). The electronic apparatus 200 includes a position detecting device 202 of an electromagnetic induction system beneath (on the back side of) the display screen 200D.

A casing of the electronic apparatus 200 in this example is provided with a housing recess hole 201 in which to house the position pointing device 1 having a pen-like shape. A user takes out the position pointing device 1, housed in the housing recess hole 201, from the electronic apparatus 200, as required, and performs a position pointing operation using the display screen 200D as an input surface.

In the electronic apparatus 200, when a position pointing operation is conducted by use of the pen-like position pointing device 1 on the display screen 200D, the position detecting device 202 provided on the back side of the display screen 200D detects a position and a writing pressure relevant to the operation of the position pointing device 1, and a microcomputer possessed by the position detecting device 202 of the electronic apparatus 200 performs a display processing according to the operating position and the writing pressure on the display screen 200D.

Figure 1B:
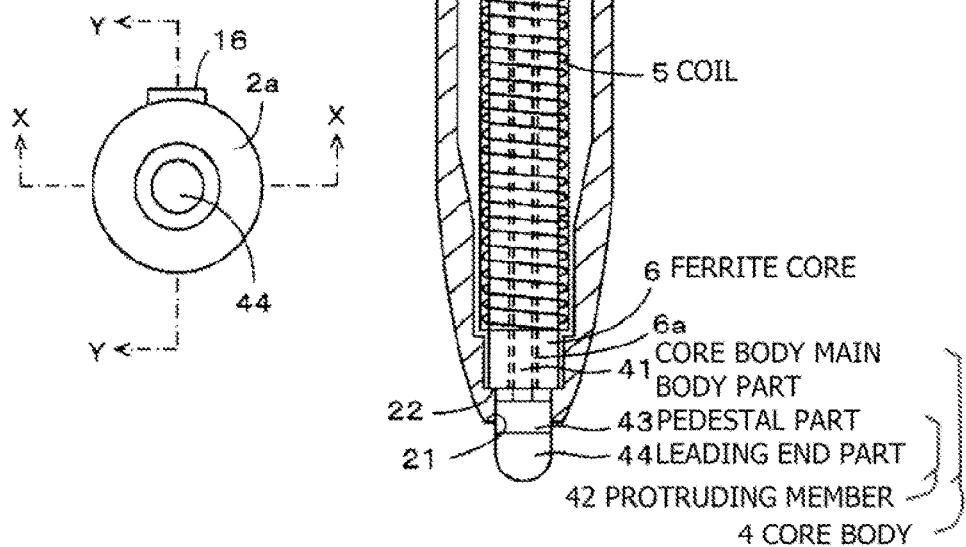

FIGS. 1(A) and 1(B) schematically show the position pointing device 1 according to the first embodiment. FIG. 1(A) shows the inside of the position pointing device 1 by breaking only a case main body 2a of a case 2 (casing) of the position pointing device 1, for explanation. FIG. 1(B) is a view showing the position pointing device 1 according to the first embodiment, as viewed in the axial direction thereof from the side of a core body 4.

As depicted in FIG. 1(A), the position pointing device 1 includes the case 2 constituting a bottomed cylindrical casing which is elongated in the axial direction, is open on one side with respect to the axial direction and is closed on the other side with respect to the axial direction. The case 2 includes a cylindrical case main body 2*a* provided therein with a cavity and a case cap 2*b* to be coupled with the case main body 2*a*, each of which is formed from, for example, a resin or the like. In the cavity of the case main body 2*a*, a core body 4 and a magnetic material core, in this example, a ferrite core 6, with a coil 5 wound therearound are housed in the state of being connected to a board holder 3. Part of the core body 4 is exposed by protruding to the exterior via an opening 21 formed at an end portion, on one side in the axial direction, of the case main body 2*a*, which end portion constitutes a pen point.

The ferrite core 6, in this example, has a cylindrical columnar shape provided therein and along its center axis with a penetration hole 6*a* having a predetermined diameter. A core body main body part 41 (described later) of the core body 4 is inserted in the penetration hole 6*a* of the ferrite core 6 and is connected to the board holder 3. The inside diameter of the penetration hole 6*a* of the ferrite core 6 is selected to be greater than the diameter of the core body main body part 41 of the core body 4. Accordingly, the core body 4 is connected to the board holder 3 in the state of being movable in the axial direction through the penetration hole 6*a* of the ferrite core 6.

The board holder 3 is formed of, for example, a resin. The board holder 3 has a configuration wherein a pressure-sensing component holder part 3*a* and a printed circuit board mount part 3*b* are contiguous with each other along a longitudinal direction which coincides with the axial direction of the position pointing device 1 when the board holder 3 is housed in the cavity of the case main body 2*a*. Pressure-sensing components (a plurality of components for detection of a writing pressure) 7 are housed in the pressure-sensing component holder part 3*a*, whereas a printed circuit board 8 is mounted on and held by the printed circuit board mount part 3*b*. For simplicity of description, the pressure-sensing component holder part 3*a* will be referred to simply as the holder part 3*a*. The holder part 3*a* is formed on the most core body 4 side in the board holder 3. The core body 4 and the ferrite core 6 are connected to the holder part 3*a*.

Figure 3A:
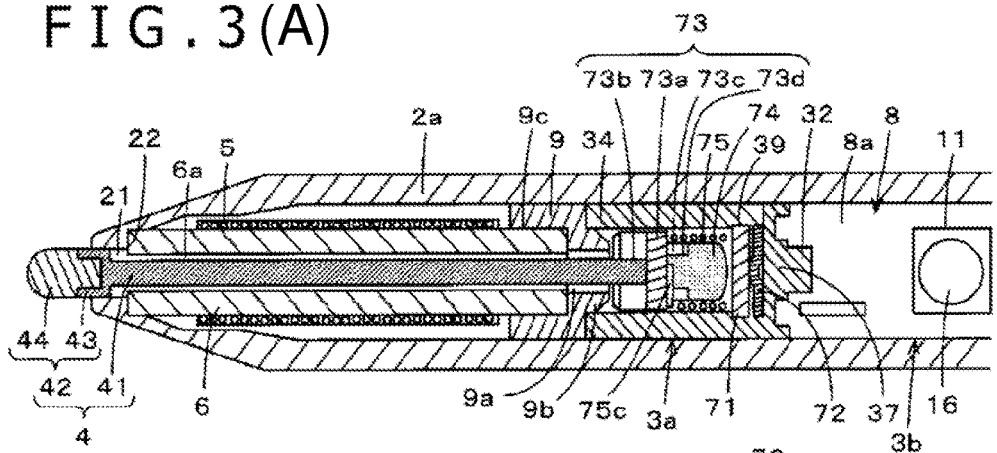
FIG. 3(A) is a sectional view of the position pointing device taken along line X-X in FIG. 1(B)
Figure 3B:
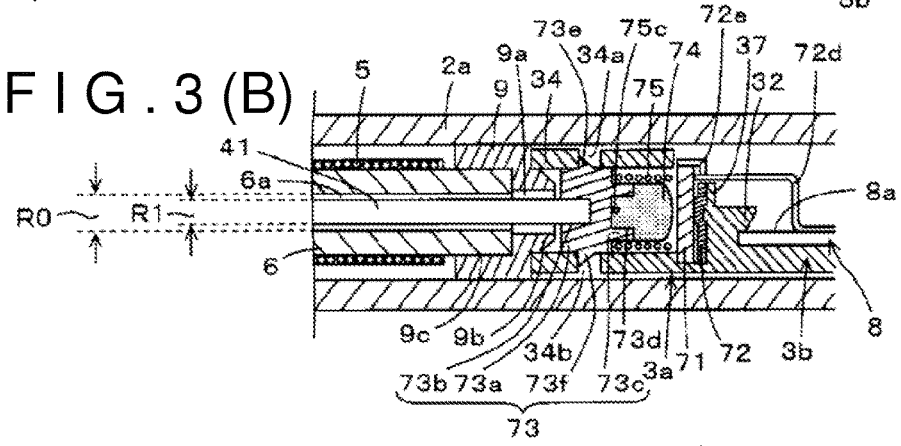
FIG. 3(B) is a sectional view of the position pointing device taken along line Y-Y in FIG. 1(B)
Figure 3C:
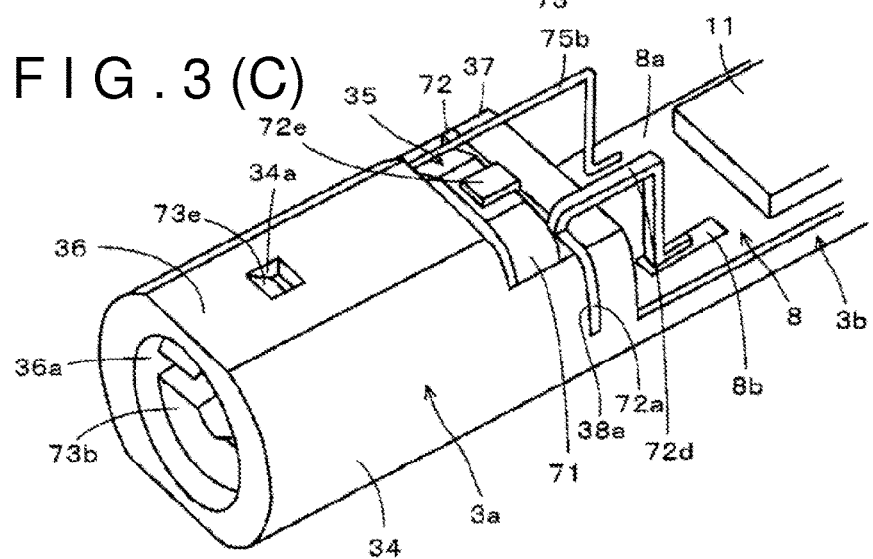
FIG. 3(C) is a perspective view of part of the position pointing device according to the first embodiment.

FIG. 3(A) is a sectional view taken along line X-X of FIG. 1(B), obtained by cutting the position pointing device 1 along a plane passing through the center axis of the position pointing device 1 and parallel to a substrate surface (a surface on which a conductor pattern is printed and on which circuit parts are placed) 8*a* of the printed circuit board 8. In addition, FIG. 3(B) is a sectional view taken along line Y-Y of FIG. 1(B), obtained by cutting the position pointing device 1 along a plane passing through the center axis of the position pointing device 1 and orthogonal to the substrate surface 8*a* of the printed circuit board 8. Further, FIG. 3(C) is a perspective view taken including the holder part 3*a* of the board holder 3.

FIG. 4(B) illustrates a condition where the board holder 3 is connected with the core body 4 as well as the ferrite core 6. In addition, FIG. 4(A) is an exploded perspective view for explaining the holder part 3*a* of the board holder 3 and the pressure-sensing components 7.

A push switch (side switch) 11 which is turned ON when depressed and is returned into an OFF state when released from depression is provided on the printed circuit board 8, and capacitors 12 and 13 constituting a resonance circuit together with the coil 5 are provided on the printed circuit board 8. Furthermore, an integrated circuit (IC) 14 is provided on the printed circuit board 8.

In this example, a side peripheral surface of the case main body 2*a* of the position pointing device 1 has a through-hole 15 (see FIG. 2) bored in a position corresponding to the side switch 11. A depression operating element 16 of the side switch 11 is exposed via the through-hole 15 so that it can be operated to depress the side switch 11.

The capacitors 12 and 13 constituting part of the resonance circuit and the IC 14 are, in this example, disposed on the printed circuit board 8 as chip parts. In this embodiment, the capacitance of the capacitor 12, which is a trimmer capacitor, is regulated, whereby the resonance frequency of the resonance circuit is controlled.

In the holder part 3*a* of the board holder 3, the pressure-sensing components 7 consisting of a plurality of components are housed, as shown in FIGS. 1(A), 3(A)-3(C), and 4(A). With the pressure-sensing components 7 thus housed in the holder part 3*a*, a writing pressure detection module is configured. The core body main body part 41 of the core body 4 is connected to the writing pressure detection module, whereby the writing pressure exerted on a protruding member 42 of the core body 4 is detected by the pressure-sensing components 7 of the writing pressure detection module. In this case, the writing pressure detection module detects the writing pressure through a process in which a part of the pressure-sensing components 7 constituting the module is moved in the axial direction together with the core body 4 according to the writing pressure exerted on the protruding member 42 of the core body 4.

In this example, an assembly wherein the printed circuit board 8 is mounted on and fixed to the printed circuit board mount part 3*b* of the board holder 3, the pressure-sensing components 7 are housed in the holder part 3*a*, and the ferrite core 6 with the coil 5 wound therearound and the core body 4 are connected to the board holder 3, can be handled as a single module part. By housing this module part in the cavity of the case main body 2*a*, the position pointing device 1 can be completed. It is to be noted that the core body 4 is detachably connected to the board holder 3, as will be described later. In other words, in the position pointing device 1 in this embodiment, the core body 4 is configured to be replaceable.

As shown in FIGS. 1(A) and 3(A), one end of the case main body 2*a* with respect to the axial direction is the pen point side of the pen-shaped position pointing device 1, and the case main body 2*a* is provided on the pen point side with an opening 21 consisting of a through-hole.

As depicted in FIGS. 1(A) and 3(A), the core body 4 in this example includes the protruding member (pen point member) 42 protruding from the opening 21 of the case main body 2*a* to the exterior and the core body main body part 41. FIGS. 5(A)-5(D) show a configuration example of the core body 4 in this first embodiment. FIG. 5(A) is a side view of the core body 4. FIG. 5(B) is a view of the core body 4 as viewed in the axial direction thereof from the side of the core body main body part 41. FIG. 5(C) is a sectional view (a longitudinal sectional view of the core body 4) taken along line B-B of FIG. 5(A). Further, FIG. 5(D) is a view for explaining a producing method and assembly of the core body 4 in the first embodiment.

The core body main body part 41 in this example is an elongate bar-shaped body circular in section, and, as aforementioned, it has an outside diameter R1 smaller than an inside diameter R0 of the penetration hole 6*a* of the ferrite core 6 (see FIG. 3(B)) and an inside diameter of R1. The protruding member 42 has a so-called cannonball- or shell-type cylindrical shape with a tip in a dome-like, hemispherical, or spindle-like shape, and an outside diameter R2 thereof (see FIG. 5(B)) is selected to be greater than the inside diameter R0 of the penetration hole 6*a* of the ferrite core 6 and smaller than a diameter R3 of the opening 21 of the case main body 2*a*. The outside diameter R2 of the protruding member 42 is, for example, 1.0 mm to 2.0 mm.

The protruding member 42 includes a pedestal part 43 and a leading end part 44 which are joined to each other in the axial direction. The pedestal part 43 and the leading end part 44 are configured as separate members. The pedestal part 43 and the leading end part 44 as separate members are joined to each other, whereby the protruding member 42 is assembled.

The leading end part 44 is a part which is as a whole exposed to the exterior via the opening 21 of the case main body 2*a* in the condition where the core body 4 is connected to the board holder 3, as shown in FIGS. 1(A), 1(B), and 3(A), and which serves as the so-called pen point. In this example, the leading end part 44 has a cannonball- or shell-like shape with the outside diameter of R2.

On the other hand, the pedestal part 43 in this example has a cylindrical shape having an outside diameter equal to the outside diameter R2 of the leading end part 44. In addition, the pedestal part 43 is provided, along its axial direction, with a recess 43*a* having an opening on the side of an end face opposed to the leading end part 44, as shown in FIGS. 5(C) and 5(D). In this first embodiment, as shown in FIG. 5(C), from an end face of the pedestal part 43 on the opposite side from the side where the recess 43*a* is formed, the core body main body part 41 is extended integrally with and as the same member as the pedestal part 43.

Besides, as shown in FIGS. 5(C) and 5(D), at an end face of the leading end part 44 opposed to the pedestal part 43, there is formed a projection 44*a* which fits in the recess 43*a* of the pedestal part 43.

In the case of this example, the pedestal part 43 configured integrally with the core body main body part 41 is formed of a rigid material so that the core body main body part 41, inserted in (passed through) the penetration hole 6*a* of the ferrite core 6 and connected to the pressure-sensing component 7 on the board holder 3, can sufficiently transmit a pressure (writing pressure) exerted on the leading end part 44 to the pressure-sensing component 7. In the first embodiment, the core body main body part 41 and the pedestal part 43 are formed of a resin, for example, polycarbonate. It is to be noted that the resin constituting the pedestal part 43 configured integrally with the core body main body part 41 is not limited to polycarbonate but may be other rigid resin such as synthetic resins and acrylonitrile-butadiene-styrene (ABS) resin.

On the other hand, the leading end part 44 is formed of an elastic material which is more flexible than the core part main body part 41 and the pedestal part 43 so that it does not mar the display screen 200D of the electronic apparatus 200 even on contacting the display screen 200D. In this first embodiment, the leading end part 44 is formed of, for example, an elastomer, preferably, a thermosetting elastomer. In this example, there was used a material wherein PRIMALLOY (registered trademark) produced by Mitsubishi Chemical Corporation was used as an elastomer base material and was enhanced in abrasion resistance by admixing it with, for example, potassium titanate, such as "TISMO" and "POTICON" produced by Otsuka Chemical Co., Ltd.

In this embodiment, the core body 4 is produced by a method wherein the core body main body part 41 and the pedestal part 43 configured as one body and the leading end part 44 are welded to each other, preferably heat-welded to each other. In this embodiment, two-color molding is used for the heat welding. In this embodiment, in the two-color molding, first, using an elastomer as a primary material, the leading end part 44 is formed by use of a mold for molding the leading end part 44. Thereafter, a polycarbonate as a secondary material is poured into a mold for molding the pedestal part 43 and the core body main body part 41 so as to form the pedestal part 43 and the core body main body part 41 integral with the pedestal part 43, in such a manner that the projection 44*a* of the leading end part 44 fits in the recess 43*a* of the pedestal part 43.

When the two-color molding is conducted in this manner, the high temperature of the secondary material resin ensures that when the secondary material is poured into contact with the leading end part 44 formed of the primary material elastomer, the elastomer is re-melted and, as a result, the adhesion between the leading end part 44 and the pedestal part 43 is enhanced. Accordingly, the leading end part 44 and the pedestal part 43 are firmly joined to each other, whereby the problem of coming-off of the leading end part 44 can be further improved.

It is to be noted that the two-color molding may be conducted as follows. First, a polycarbonate as a primary material is poured into a mold for molding the pedestal part 43 and the core body main body part 41, to form the pedestal part 43 and the core body main body part 41 integral with the pedestal part 43. Thereafter, an elastomer as a secondary material is poured into a mold for molding the leading end part 44 so as to form the leading end part 44, in such a manner that the projection 44*a* of the leading end part 44 fits in the recess 43*a* of the pedestal part 43.

Note that in performing the two-color molding as above, it is further preferable that joining surfaces of the projection 44*a* of the leading end part 44 for joining to the pedestal part 43 are preliminarily subjected to a graining process such as, for example, electric discharge graining, so that the leading end part 44 and the pedestal part 43 can be securely joined to each other.

Figure 19A:
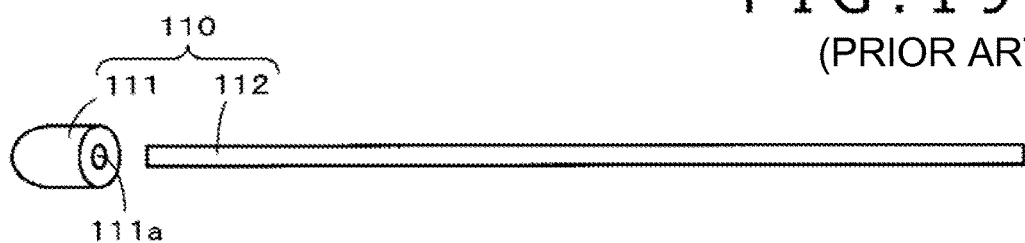
FIGS. 19(A) and 19(B) are plan views of a core body in a conventional position pointing device.
Figure 19B:
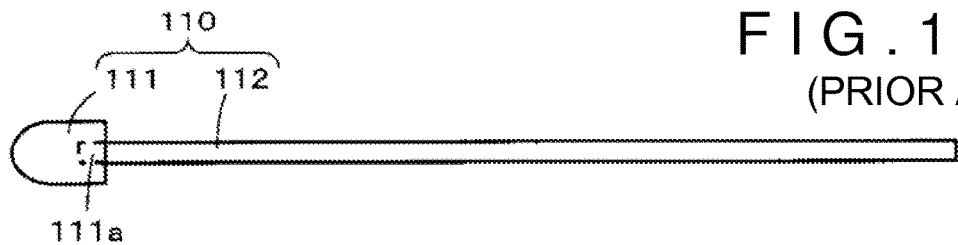

The core body 4 configured as above can be largely improved as to the problem of coming-off of the leading end part 44 during use, as compared with the core body 110 described in the beginning of the present specification with reference to FIG. 19. Specifically, in the core body 4 in this first embodiment, the leading end part 44 of the core body 4 is not joined directly to the elongate bar-shaped core body main body part 41 as in the example shown in FIG. 19, but is joined to the pedestal part 43 which is larger than the core body main body part 41 in diameter, whereby the core body main body part 41 and the leading end part 44 are joined to each other.

When the projection 44*a* of the leading end part 44 is fitted into the recess 43*a* of the pedestal part 43 to join both the parts to each other, the joining surfaces between the parts include not only the mutual fitting surfaces of the projection 44*a* and the recess 43*a* but also the mutually opposed end faces of the parts, so that a larger joint area can be obtained as compared with the case of FIG. 19. Accordingly, the leading end part 44 can be joined to the pedestal part 43 comparatively firmly. In this case, in the first embodiment as aforementioned, the pedestal part 43 has the same outside diameter as that of the leading end part 44, and the joint area relevant to the end face of the leading end part 44 on the pedestal part 43 side is maximized. This point also contributes to enhancement of the joint strength.

Furthermore, in this first embodiment, the leading end part 44 and the pedestal part 43 formed integrally with the core body main body part 41 are joined to each other by heat welding, in this example, by two-color molding. Therefore, the joining portions of the leading end part 44 and the pedestal part 43 are welded to each other and thereby joined together with good affinity, so that the leading end part 44 is connected to the pedestal part 43 more firmly. In the case of the aforementioned embodiment, the two-color molding process is conducted by first forming the leading end part 44 using an elastomer as a primary material, and thereafter pouring a high-temperature resin as a secondary material to mold the pedestal part 43 integral with the core body main body part 41, thereby re-melting the joining surface of the leading end part 44 for joining to the pedestal part 43, whereby joining of the leading end part 44 to the pedestal part 43 can be realized. Consequently, it is possible to enhance the adhesion between the parts to be joined to each other, and to further enhance the joint strength between the parts.

Besides, in this first embodiment, since the core body main body part 41 and the pedestal part 43 are configured to be integral with each other, the problem of disengagement or detachment between the core body main body part 41 and the pedestal part 43 is not generated.

The core body 4 configured as above is so disposed that its core body main body part 41 is inserted in (passed through) the penetration hole 6a of the ferrite core 6 and is connected to one of a plurality of components constituting the pressure-sensing components 7, in an insertable and detachable manner, as will be described later. In this connected state, the leading end part 44 as a whole is completely protruding from the opening 21 of the case main body 2a of the position pointing device 1 to be exposed to the exterior, as aforementioned. As shown in FIGS. 1(A) and 3(A), the pedestal part 43 is located at that part of the case main body 2a at which the opening 21 is provided. Specifically, a length of the core body 4 in its axial direction and a length d1 of the pedestal part 43 in its axial direction (see FIGS. 5(A) and 5(C)) is so selected that in the condition where the core body 4 is connected to the board holder 3, a peripheral side surface of the pedestal part 43 is opposed (faced) to an end surface in the axial direction of the through-hole constituting the opening 21 (this end surface will hereinafter be referred to as the inner wall surface of the opening 21).

Furthermore, the length of the core body 4 in its axial direction and the length d1 of the pedestal part 43 in its axial direction are so set that even when a pressure is exerted on the leading end part 44 of the core body 4 and the core body 4 is moved in the axial direction by a maximum movement amount thereof, the condition where the peripheral side surface of the pedestal part 43 is opposed (faced) to the inner wall surface of the opening 21 is maintained, so that a condition where part of the leading end part 44 is opposed (faced) to the inner wall surface of the opening 21 is avoided.

In the aforementioned embodiment, therefore, it can be ensured that a situation wherein the peripheral side surface of the leading end part 44 formed of an elastic material more flexible (softer) than the pedestal part 43 comes into frictional contact with the inner wall surface of the opening 21 is not brought about even when a pressure is exerted on the leading end part 44 of the core body 4.

The leading end part 44 of the protruding member 42 of the core body 4 is formed of an elastomer, which is low in hardness and is poor in slidability. If the leading end part 44 comes into frictional contact with the inner wall surface of the opening 21 of the case main body 2a, therefore, accurate pressure transmission to the pressure-sensing components 7 may be failed. In the first embodiment, however, the configuration wherein the part which is opposed to the inner wall surface of the opening 21 of the case main body 2a is necessarily a part of the pedestal part 43 is adopted, and the pedestal part 43 is formed of a material high in hardness, such as polycarbonate. Therefore, a problem that the leading end part 44 is caught on the opening 21 of the case main body 2a can be obviated effectively.

Besides, in this first embodiment, as aforementioned, the core body 4 is inserted in (passed through) the penetration hole 6a of the ferrite core 6 and is connected to the pressure-sensing component 7 in an insertable and detachable manner. This ensures that the core body 4 is replaceable.

As the core body 4, there are provided a plurality of kinds of core bodies which differ in at least the material constituting the leading end part 44. For instance, in relation to the feeling of contact between the leading end part 44 of the core body 4 and the input surface of the position detecting device, there may be provided a core body formed of a material which offers a feeling of smooth sliding, a core body formed of a material which produces some feelings of being caught, or a core body formed of a material which gives a feeling of comparatively soft contact. The position pointing device 1 in this embodiment is so configured that the core body 4 can be taken out by gripping that portion of the protruding member 42 which is exposed from the opening 21 of the case main body 2a of the position pointing device 1 to the exterior and pulling it away from the case main body 2a, as will be described later. In addition, the position pointing device 1 is so configured that a core body 4 for replacing the pulled-out core body 4 can be put into position by inserting it via the opening 21 of the case main body 2a of the position pointing device 1, passing it through the penetration hole 6a of the ferrite core 6, and fitting it to the pressure-sensing component 7.

In other words, in the position pointing device 1 according to the aforementioned embodiment, core bodies 4 capable of realizing a variety of writing feelings can be configured by adopting elastomers offering various hardnesses and material feelings, as the elastomer constituting the leading end part 4 of the core body 4. The user of the position pointing device 1 can select a core body 4 according to the user's taste from among the plurality of core bodies offering the various writing feelings and can utilize the selected core body 4 by mounting it to the position pointing device 1. In addition, the user can replace the protruding member with a new one and use the position pointing device 1 with the new protruding member, according to the purpose of operating the position pointing device 1.

Now, the holder part 3a of the board holder 3 and the pressure-sensing components 7 constituting the writing pressure detection module will be described below. The writing pressure detection module in this example corresponds to the case where a variable capacitor having a capacitance varied according to a writing pressure exerted on the core body 4 is used, like the one described in the beginning of the present specification with reference to Patent Document 1.

The pressure-sensing components 7 in this example include a plurality of components, namely, a dielectric 71, a terminal member 72, a retaining member 73, a conductive member 74, and an elastic member 75, as depicted in FIG.

4(A). The terminal member 72 constitutes a first electrode of the variable capacitor composed of the pressure-sensing components 7. The conductive member 74 and the elastic member 75 are electrically connected to each other, to constitute a second electrode of the variable capacitor.

On the other hand, as shown in FIGS. 3(C) and 4(A), the holder part 3a of the board holder 3 includes a tubular body 34 having a cavity, in which the pressure-sensing components 7 are housed in the state of being aligned in the axial direction of the tubular body 34.

Of the pressure-sensing components 7 consisting of the plurality of components as above-mentioned, the dielectric 71 and the terminal member 72, which are components not moved in the axial direction within the holder part 3a composed of the tubular body 34, as shown in FIG. 4(A), are inserted into the tubular body 34 constituting the holder part 3a in a direction orthogonal to the axial direction of the tubular body 34 and perpendicular to the substrate surface 8a of the printed circuit board 8, by way of an opening 35 formed in a part of a side peripheral surface of the tubular body 34 and opening in a direction orthogonal to the axial direction of the tubular body 34, and are housed in the tubular body 34, as shown in FIGS. 3(C) and 4(B).

Note that a connecting portion of the side peripheral surface of the tubular body 34 for connection with a wall part 37 is formed therein with slits 38a and 38b which each have a predetermined width greater than the thickness of the terminal member 72, as measured in the axial direction of the tubular body 34. The terminal member 72 has protruding parts 72a and 72b which fit in the slit 38a and 38b. With the protruding parts 72a and 72b fitted in the slits 38a and 38b in the tubular body 34, therefore, the terminal member 72 is locked to the tubular body 34 so as not to be moved in the axial direction of the tubular body 34.

In addition, the inner wall of the tubular body 34 is formed, in a position adjacent to the slits 38a and 38b in the axial direction, with a recessed groove 39 (see FIG. 3(A)) having an inside diameter greater than the inside diameter of that portion of the tubular body 34 at which the opening 35 is formed. The dielectric 71 is configured as a plate-shaped body having such an external shape as to fit in the recessed groove 39 and having a thickness corresponding to the width of the recessed groove 39 in the axial direction. Therefore, when the dielectric 71 is inserted through the opening 35 into the recessed groove 39 of the tubular body 34 and fitted in the recessed groove 39, the dielectric 71 in the fitted state is prevented from moving in the axial direction within the tubular body 34.

The tubular body 34 constituting the holder part 3a has an opening 36a on the core body 4 side with respect to the axial direction thereof. On the other hand, the tubular body 34 constituting the holder part 3a is closed with a wall part 37 on the printed circuit board mount part 3b side.

An assembly having the conductive member 74 joined to the retaining member 73 in the axial direction thereof through the elastic member 75 is inserted into the tubular body 34 from the opening 36a side. Engaging projections 73e and 73f formed at a side peripheral surface of a cylindrically shaped part 73a of the retaining member 73 are engaged with engaging holes 34a and 34b (see FIG. 3(B)) formed in a side peripheral surface of the tubular body 34 constituting the holder part 3a, whereby the retaining member 73 is locked to the tubular body 34. It should be noted here that the engaging projections 73e and 73f and the engaging holes 34a and 34b are configured so that the retaining member 73 in the state of being housed in the cavity of the tubular body 34 can be moved in the axial direction within the cavity of the tubular body 34.

The terminal member 72 serving as the first electrode of the variable capacitor is provided with a lead part 72d. The lead part 72d, when housed in the holder part 3a, is connected by soldering to a land part 8b (see FIG. 3(C)) of the substrate surface 8a of the printed circuit board 8 mounted on the printed circuit board mount part 3b, in the manner of straddling the wall part 37 of the tubular body 34.

Note that the terminal member 72 is provided with an L-shaped projection 72e which is pressed by an opening-side end portion of the dielectric 71 when the dielectric 71 and the terminal member 72 are housed in the holder part 3a.

The retaining member 73 is provided, on the core body 4 side with respect to the axial direction thereof, with the cylindrically shaped part 73a provided with a recess hole 73b in which to press fit the core body main body part 41 of the core body 4, and is provided, on the opposite side in the axial direction from the recess hole 73b, with a ring-shaped projection 73c provided with a recess hole 73d in which to fit the conductive member 74.

The conductive member 74 includes an elastic member which is electrically conductive and elastically deformable; for instance, the conductive member 74 is formed of a silicone conductive rubber or a pressure-sensitive conductive rubber. The conductive member 74 is provided with a projection 74a which fits into the recess hole 73d of the ring-shaped projection 73c of the retaining member 73. The elastic member 75 includes a winding part 75a composed, for example, of a conductive coil spring and being elastic, with a terminal piece 75b at one end portion of the winding part 75a and with a connection part 75c at the other end portion of the winding part 75a.

The elastic member 75 is combined with the retaining member 73 in the axial direction of the retaining member 73, in such a manner that the ring-shaped projection 73c of the retaining member 73 is housed in the winding part 75a of the elastic member 75. In addition, the projection 74a of the conductive member 74 is fitted in the recess hole 73d of the ring-shaped projection 73c of the retaining member 73. In this instance, the connection part 75c of the elastic member 75 is inserted through a slit portion of the ring-shaped projection 73c of the retaining member 73 into a bottom portion of a recess hole 73d formed in the ring-shaped projection 73c (see FIGS. 3(A) and 3(B)). Therefore, when a small-diameter part 74b of the conductive member 74 is press fitted in the ring-shaped projection 73c of the retaining member 73, an end face of the small diameter part 74b of the conductive member 74 makes contact with the connection part 75c of the elastic member 75 which is conductive, whereby electrical connection is established.

In addition, the terminal piece 75b of the elastic member 75, when inserted in the tubular body 34, is connected by soldering to a conductor pattern at the substrate surface 8a of the printed circuit board 8 mounted on the printed circuit board mount part 3b, in the manner of straddling the dielectric 71, the terminal member 72, and the wall part 37.

After the pressure-sensing components 7 are housed in the tubular body 34 constituting the holder part 3a as above-mentioned, an anti-dropping member 9 is press fitted into the opening 36a of the tubular body 34, as shown in FIGS. 3(A), 3(B), and 4(B). As shown in FIGS. 3(A) and 3(B), the anti-dropping member 9 has a through-hole 45a through which to pass the core body main body part 41 of the core body 4 in the axial direction, and is provided with a cylindrical part 9b having an outside diameter approximately equal to or slightly smaller than the inside diameter of a part 36 of the tubular body 34 which is on the opening 36a side. The anti-dropping member 9 is connected to the holder part 3a, with its cylindrical part 9b press fitted into the part 36 on the opening 36a side of the tubular body 34.

In addition, the anti-dropping member 9 is formed, on the opposite side in the axial direction from the cylindrical part 9b, with a recess 9c having an inside diameter approximately equal to the outside diameter of the ferrite core 6. An end portion of the ferrite core 6 on the opposite side from the side of the protruding member 42 of the core body 4 is press fitted into the recess 9c of the anti-dropping member 9, whereby the ferrite core 6 is connected to the holder part 3a of the board holder 3 through the anti-dropping member 9.

Next, in the condition where the ferrite core 6 is connected to the board holder 3 as above-mentioned, the core body main body part 41 of the core body 4 is inserted into the penetration hole 6a of the ferrite core 6. Then, an end portion of the core body main body part 41 of the core body 4 is press fitted into the recess hole 73b of the cylindrically shaped part 73a of the retaining member 73 housed in the holder part 3a. In this case, even in the condition where the core body 4 is press fitted in the recess hole 73b of the cylindrically shaped part 73a, the core body main body part 41 of the core body 4 is exposed also to the side of the protruding member 42 of the core body 4 with respect to the ferrite core 6, as shown in FIGS. 3(A) and 4(B). In this condition, accordingly, by a pressure (writing pressure) exerted on the protruding member 42 of the core body 4, the core body 4 can be displaced in the axial direction toward the case cap 2b side, against a biasing force of the elastic member 75.

After the core body 4 is press fitted in the recess hole 73b of the cylindrically shaped part 73a of the retaining member 73, the core body 4 can be pulled out of the recess hole 73b. Therefore, the core body 4 is replaceable, as aforementioned.

In the above-mentioned manner, the printed circuit board 8 is mounted on the printed circuit board mount part 3b of the board holder 3 connected to the case cap 2b, the pressure-sensing components 7 are housed in the holder part 3a, further, the ferrite core 6 is connected to the holder part 3a, and the core body 4 is connected, whereby the module part as shown in FIG. 4(B) is formed.

Subsequently, this module part is inserted into the cavity of the case main body 2a in such a manner that the protruding member 42 of the core body 4 protrudes from the opening 21 of the case main body 2a to the exterior. Then, the case main body 2a and the case cap 2b are coupled to each other, to complete the position pointing device 1.

In this position pointing device 1, when a pressure is applied to the protruding member 42 of the core body 4, the core body 4 is displaced in the axial direction toward the inside of the case main body 2a according to the pressure. This displacement of the core body 4 causes the retaining member 73 in the holder part 3a connected to the core body main body part 41 to be displaced toward the dielectric 71, against the elastic biasing force of the elastic member 75. As a result, the conductive member 74 fitted to the retaining member 74 is displaced toward the dielectric 71 side, whereby the distance between the conductive member 74 and the dielectric 71 and, further, the area of contact between the conductive member 74 and the dielectric 71 are varied according to the pressure exerted on the core body 4.

This results in that the capacitance of the variable capacitor, formed between the terminal member 72 constituting the first electrode and the conductive member 74 constituting the second electrode, is varied according to the pressure exerted on the core body 4. This variation in the capacitance of the variable capacitor is transmitted from the position pointing device 1 to the position detecting device 202, whereby the writing pressure exerted on the core body 4 of the position pointing device 1 is detected in the position detecting device 202.

As a circuit configuration of the position detecting device 202 which performs position detection and writing pressure detection through electromagnetic induction coupling with the position pointing device 1 in this first embodiment, there can be applied conventionally known circuit configurations such as those described in Japanese Patent Laid-Open No. 2005-10844 and Japanese Patent Laid-Open No. 2007-164356, and, therefore, detailed description of such a circuit configuration is omitted herein.

[Second Embodiment]

A second embodiment of the position pointing device according to the present invention will be described below, referring to FIGS. 6 to 9(B). While the position pointing device 1 according to the first embodiment corresponds to the case where a variable capacitor is used for detection of a writing pressure, a position pointing device 1B according to the second embodiment corresponds to the case where a variation in inductance of a coil constituting a resonance circuit is detected for detection of a writing pressure.

The position pointing device 1B in the second embodiment is also used with a position detecting device 202B mounted on the electronic apparatus 200 shown in FIG. 2, like in the first embodiment. It is to be noted here, however, that correspondingly to the fact that the position pointing device 1B in the second embodiment utilizes a variation in inductance of the coil of the resonance circuit, the position detecting device 202B differs from the position detecting device 202 in the method of detecting the writing pressure. A circuitry of the position pointing device 1B and a circuit configuration of the position detecting device 202B will be described later. Incidentally, in the description of the second embodiment, the same parts as those in the first embodiment are denoted by the same reference symbols as used above, and detailed descriptions of them are omitted here. Besides, in the following description of the second embodiment, the parts corresponding to the parts in the first embodiment will be denoted by reference symbols obtained by adding a suffix B to the reference symbols used hereinabove.

Figure 6:
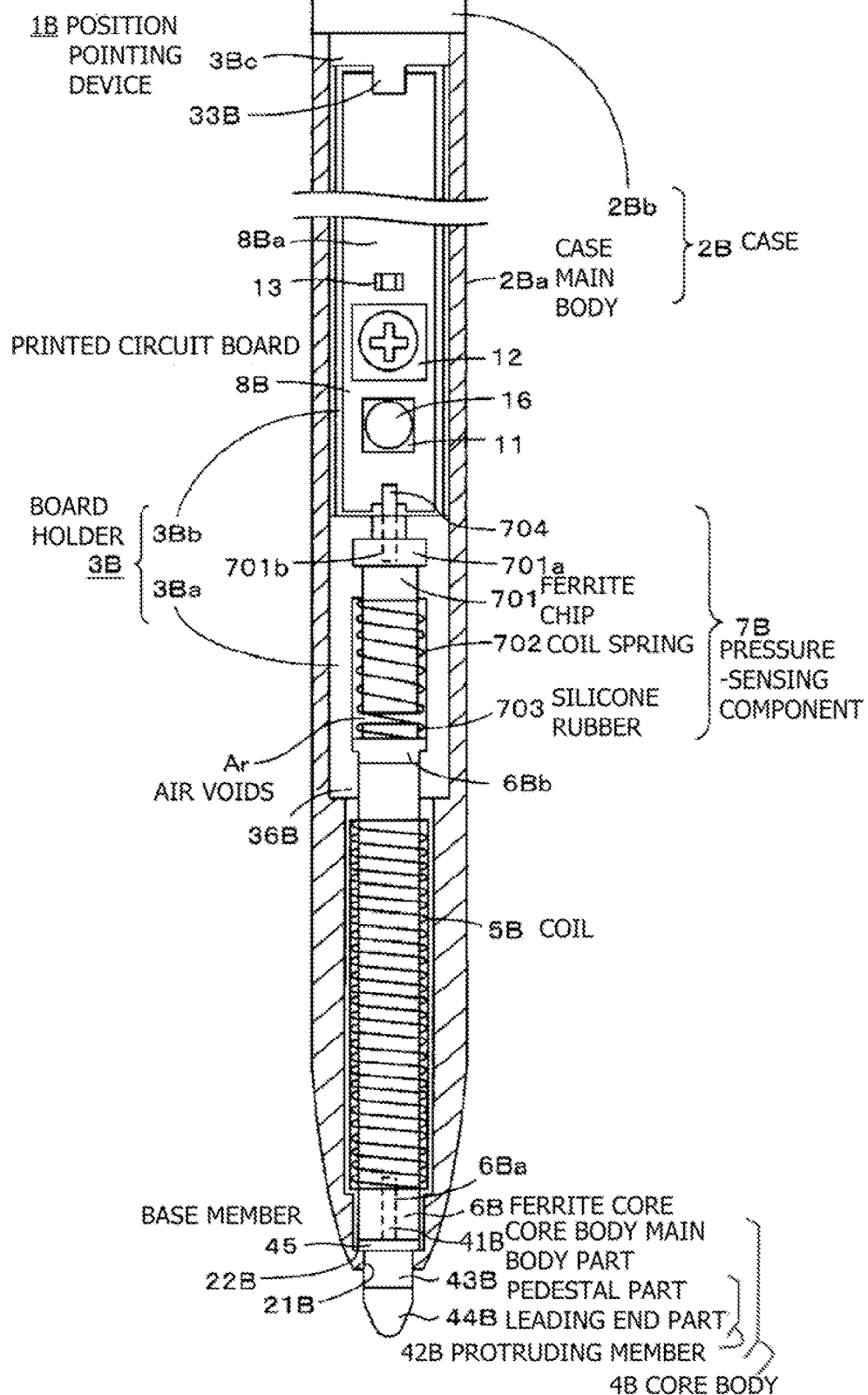
FIG. 6 is a sectional view of a position pointing device according to a second embodiment of the present disclosure.

FIG. 6 schematically illustrates the position pointing device 1B according to the second embodiment. For explanation, FIG. 6 shows the inside of the position pointing device 1B by breaking only a case main body 2Ba of a case 2B of the position pointing device 1B, like FIG. 1 in the first embodiment described above.

In the second embodiment, a board holder 3B which is formed of, for example, a resin and which holds a core body 4B, a ferrite core 6B with a coil 5B wound therearound, pressure-sensing components (writing pressure detecting components) 7B, and a printed circuit board 8B is housed in a cavity of the case main body 2Ba, like in the first embodiment. A longitudinal end portion of the board holder 3B is connected to a case cap 2Bb at a connection part 3Bc of the board holder 3B, like in the case of the board holder 3 in the first embodiment.

In the position pointing device 1B in this second embodiment, the ferrite core 6B is not provided with any penetration hole, and the core body 4B is connected to the ferrite core 6B in an insertable and detachable manner. In this case, in the second embodiment, the core body 4B is mounted and connected to the ferrite core 6B in an insertable and detachable manner by way of a base member 45. When a writing pressure is exerted on the core body 4B, the core body 4B and the ferrite core 6B are displaced as one body, to transmit the pressure to the pressure-sensing components 7B.

Figure 7A:
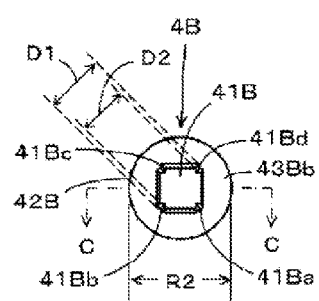
FIG. 7(A) is a sectional view of a core body of the position pointing device according to the second embodiment.
Figure 7B:
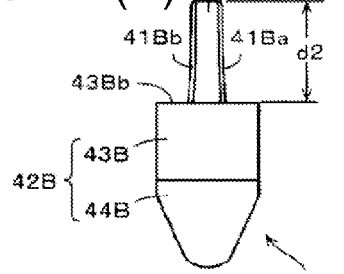
FIG. 7(B) is a plan view of the core body.
Figure 7C:
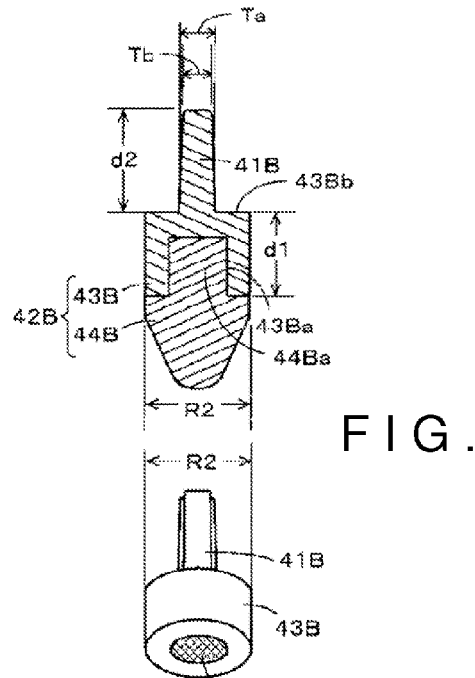
FIG. 7(C) is a sectional view taken along line C-C in FIG. 7(A)
Figure 7D:
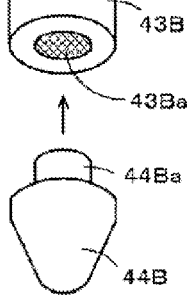
FIG. 7(D) is an exploded view of the core body.
Figure 7E:
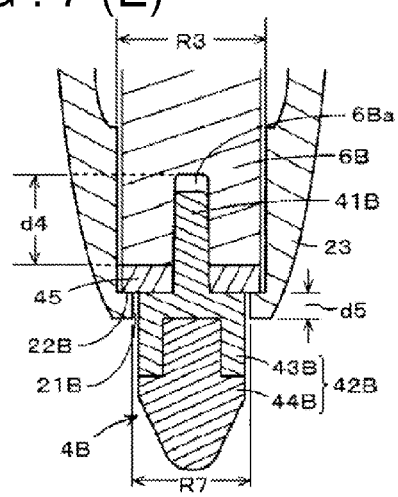

FIGS. 7(A) to 7(E) show views for explaining the configuration of the core body 4B in the second embodiment. FIG. 7(A) shows the core body 4B in the second embodiment as viewed in the axial direction thereof from the opposite side from a leading end part 44B, FIG. 7(B) is a side view of the core body 4B, and FIG. 7(C) is a sectional view taken along line C-C of FIG. 7(A). In addition, FIG. 7(D) is an assembly diagram of the core body 4B in the second embodiment. Further, FIG. 7(E) is an enlarged sectional view of the vicinity of the core body 4B in the position pointing device 1B in the second embodiment shown in FIG. 6.

In the second embodiment, as shown in FIGS. 7(A) to 7(E), the core body 4B includes a core body main body part 41B and a protruding member 42B, like the core body 4 in the first embodiment, and the protruding member 42B includes a pedestal part 43B and a leading end part 44B. The protruding member 42B is formed by forming and connecting the pedestal part 43B and the leading end part 44B by welding, particularly by two-color molding as an example of heat welding, like the protruding member 42 of the core body 4 in the first embodiment.

Specifically, as shown in FIG. 7(C), the pedestal part 43B and the leading end part 44B are connected by two-color molding in such a manner that a projection 44Ba of the leading end part 44B fits in a fitting recess 43Ba of the pedestal part 43B, whereby the core body 4B is formed. In the second embodiment, also, the leading end part 44B is formed from an elastic material, for example, a thermoplastic elastomer, whereas the pedestal part 43B and the core body main body part 41B integral with the pedestal part 43B are formed from a rigid resin, for example, POM (polyoxymethylene; polyacetal) resin. The pedestal part 43B and the core body main body part 41B may also be formed from ABS resin.

In the core body 4B in the second embodiment, the core body main body part 41B is fitted in and connected to the ferrite core 6B without being passed through the ferrite core 6B in the axial direction, and, therefore, its length in the axial direction is shorter than that of the core body 4 in the first embodiment. In addition, the core body main body part 41B is connected to the ferrite core 6B through the base member 45, and, therefore, the sectional shape of the core body main body part 41B is different from that of the core body 4 in the first embodiment.

As shown in FIGS. 7(A) to 7(E), the core body main body part 41B is formed as one body with the pedestal part 43B, at a central portion of an end surface 43Bb of the pedestal part 43B on the opposite side from the leading end part 44B. The core body main body part 41B in this example has a tetragonal prismatic overall shape, as shown in FIG. 7(A), and each of four notches 41Ba, 41Bb, 41Bc, and 41Bd formed by the four side surfaces of the tetragonal prism has a shape of being cut out in a rectangular shape along the direction of the center axis. In other words, the core body main body part 41B has a cross-sectional shape equal to a shape that is formed when two rectangles are laid to cross each other so that their longer-side directions are orthogonal to each other, with their centers of gravity coinciding with each other (see FIG. 7(A)).

As shown in FIGS. 7(B) to 7(E), the core body main body part 41B is formed to be tapered off. Specifically, as shown in FIG. 7(C), the core body main body part 41B is formed so that a distance Tb between its opposite side surfaces on its tip side is smaller than a distance Ta between its opposite side surfaces at its position of connection with the pedestal part 43B. In addition, an axial length d2 (see FIG. 7(C)) of the core body main body part 41B is selected to be greater than a height (thickness) d3 of the base member 45 (see FIG. 8(B)) to be described later, and is selected to be equal to or smaller than the depth of a recess hole 6Ba (described later) in the ferrite core 6B.

Figure 8A:
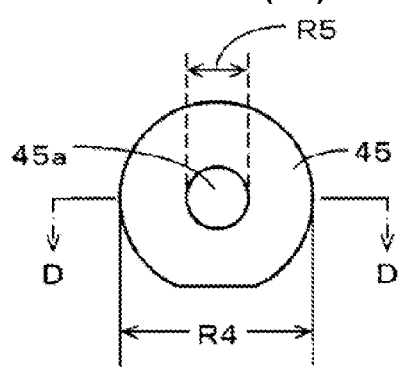
FIG. 8(A) is a sectional view of a member for mounting the core body of the position pointing device according to the second embodiment.
Figure 8B:
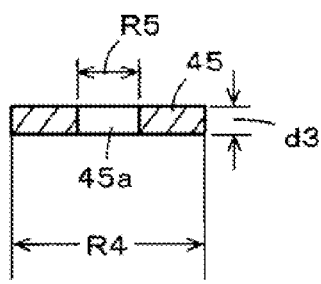
FIG. 8(B) is a sectional view taken along line D-D in FIG. 8(A).

The base member 45 will be described below. FIGS. 8(A) and 8(B) show views of a configuration example of the base member 45, wherein FIG. 8(A) is a top plan view as viewed along the axial direction, and FIG. 8(B) is a sectional view taken along line D-D of FIG. 8(A).

As shown in FIGS. 8(A) and 8(B), the base member 45 is a hollow cylinder (ring-shaped circular disc) having a height (thickness) of d3 (d3<d2). Here, the height (thickness) d3 of the base member 45 is, for example, 0.3 mm to 0.4 mm. A diameter R4 of the outer circumferential circle of the base member 45 is greater than a diameter R2 of the leading end part 44B and the pedestal part 43B of the core body 4B.

The base member 45 is formed in a central position thereof with a through-hole 45a which has a circular cross-sectional shape being concentric with the outer circumferential circle of the base member 45 and having a diameter of R5. In this example, the base member 45 is formed of a material higher in hardness than the pedestal part 43B and the core body main body part 41B of the core body 4B (which are formed of POM resin or ABS resin), for example, polycarbonate. It is to be noted that the base member 45 may be formed of a non-magnetic metal such as, for example, SUS305 or SUS310S. In that case, the pedestal part 43B and the core body main body part 41B of the core body 4B can be formed of polycarbonate.

The base member 45 in this example is fixed by adhering its plate surface on one side (with respect to the axial direction) to an end face of the ferrite core 6B on the core body 4B side by use of an adhesive. The end face of the ferrite core 6B on the core body 4B side is formed with a recess hole 6Ba having a diameter equal to or slightly greater than the diameter R5 of the through-hole 45a of the base member 45. A depth d4 of the recess hole 6Ba is greater than a dimension obtained by subtracting the height d3 of the base member 45 from the axial length d2 of the core body main body part 41B of the core body 4B in the axial direction (d4>d2−d3). The base member 45 is adhered to the ferrite core 6B while being positioned so that the center position of the through-hole 45a and the center position of the recess hole 6Ba of the ferrite core 6B coincide with each other.

In this second embodiment, also, one end side with respect to the axial direction of a case main body 2Ba is the pen point side of the position pointing device having a pen-like shape, like in the first embodiment. The case main body 2Ba is provided, on the pen point side, with an opening 21B through which the protruding member 42B of the core body 4B protrudes to the exterior. In this case, as shown in FIG. 7(E), a cavity in the case main body 2Ba has a diameter greater than the diameter R7 of the opening 21B, like in the first embodiment, and an inner wall surface defining the cavity is formed with a stepped portion 22B on the opening 21B side.

As shown in FIGS. 6 and 7(E), the ferrite core 6B is disposed inside the case main body 2Ba in such a manner that an end face of the base member 45 adhered to the ferrite core 6B is engaged with the stepped portion 22B, on the opening 21B side in the cavity of the case main body 2Ba, and that the center position of the through-hole 45a of the base member 45 coincides with the center position of the opening 21B of the case main body 2Ba.

In this case, as shown in FIGS. 6 and 7(E), the outside diameter R4 of the base member 45 is slightly smaller than or equal to the diameter R3 of the cavity of the case main body 2Ba of the position pointing device 1 on the side where the opening 21B is formed. In addition, the outside diameter R4 of the base member 45 is greater than the diameter R7 of the opening 21B of the case main body 2Ba. Namely, the outside diameter R5 of the base member 45 is in the range of R7<R4≤R3. Therefore, the base member 45 is locked by the stepped portion 22B in the case main body 2Ba, without dropping off via the opening 21B of the case main body 2Ba.

The diameter R5 of the through-hole 45a of the base member 45 is set so that the core body main body part 41B of the core body 4B is press fitted in the through-hole 45a. Specifically, in this example, as shown in FIG. 7(A), let the longest diagonal distance between diagonally opposed ones of the notches 41Ba to 41Bd at the four corners in the sectional shape of the core main body part 41B, in the example of FIG. 7(A), between the notch 41Bb and the notch 41Bd, be D1, and let the shortest diagonal distance be D2, then the diameter R6 of the through-hole 45a is selected in the following range:

$$D2<R5<D1 \quad \text{(Expression 1)}$$

Here, the core body main body part 41B is formed to be tapered off, as aforementioned. Therefore, the longest diagonal distance D1 between the notch 41Bb and the notch 41Bd is the value at the connection portion of the pedestal pan 43B for connection with the core body main body part 41B, and the shortest diagonal distance D2 is the value at the tip end portion of the core body main body part 41B.

Figure 9A:
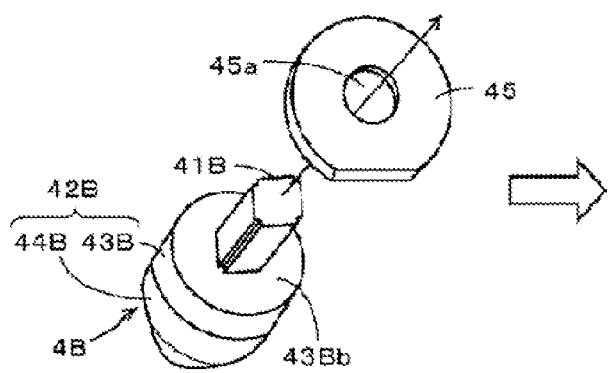
FIG. 9(A) and FIG. 9(B) are perspective views of the member for mounting the core body of the position pointing device according to the second embodiment.
Figure 9B:
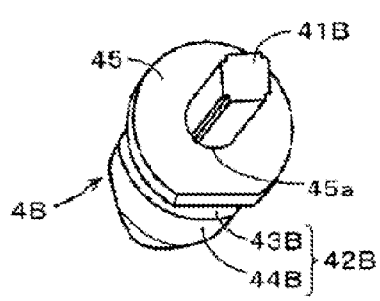

Thus, the through-hole 45a of the base member 45 is circular in shape, whereas the core body main body part 41B has a cross-sectional shape having the corner portions (edge portions), and the diameter R5 of the through-hole 45a of the base member 45 is a predetermined dimensional relation with the size of the core body main body part 41B. As a result, when the core body main body part 41B is inserted in the through-hole 45a of the base member 45 as shown in FIG. 9(A), the core body main body part 41B lower in hardness than the base member 45 is partly deformed, whereby the core body main body part 41B is fitted in the base member 45, to be held by the base member 45 in a press-fitted state, as shown in FIG. 9(B).

If the core body main body part 41B is formed to be tapered off as aforementioned in the case where the through-hole 45a of the base member 45 is circular in section and the core body main body part 41B is circular in sectional shape, the through-hole 45a of the base member 45 and the core body main body part 41B make contact with each other along a circular line. Therefore, there is no room for elastic deformation, so that it may be impossible for the core body main body part 41B to be pushed into the through-hole 45a of the base member 45 up to its connection portion (base portion) for connection with the pedestal part 43B. Particularly, it is very difficult to form the through-hole 45a with such a high accuracy that the thin (radially small) core body main body part 41B can be pushed into the through-hole 45a up to its base portion and fitted assuredly.

On the other hand, the cross-sectional shape of the core body main body part 41B in this example has a plurality of corner portions (edge portions), while the through-hole 45a of the base member 45 is circular in cross sectional shape; thus, the two cross-sectional shapes are different.

Besides, the core body main body part 41B in this example has the notches 41Ba to 41Bd at the four corners, as shown in FIG. 7(A). When the core body main body part 41B is inserted in the circular through-hole 45a of the base member 45, therefore, the core body main body part 41B make contact with the inner wall surface of the through-hole 45a at eight points. Since the core body main body part 41B is tapered off, as shown also in FIG. 7(C), the position of contact is on the tip side as compared with the connection portion of the core body main body part 41B for connection with the pedestal part 43B.

When the core body main body part 41B is press fitted into the through-hole 45a further from the contact position up to the connection portion for connection with the pedestal part 43B, however, the core body main body part 41B is deformed easily, since it is formed of a material lower in hardness than the material of the base member 45 and its portions of contact with the through-hole 45a of the base member 45 are the above-mentioned eight corner points. Therefore, by the press fitting, the corner portions (edge portions) are deformed in a collapsing manner, and the core body main body part 41B is securely fitted in the through-hole 45a of the base member 45. As a result, the core body 4B is held by the base member 45 in a press-fitted state.

It is to be noted here, however, that when a force for pulling the core body 4B out of the base member 45 is exerted on the core body 4B being in the securely held state as aforementioned, the press-fit holding of the core body main body part 41B of the core body 4B by the base member 45 is released, so that the core body 4B can be easily pulled out of the base member 45. Accordingly, in the position pointing device 1B in this second embodiment, also, the core body 4B is replaceable.

In this example, the base member 45 is fixed by adhesion to the end face of the ferrite core 6, as aforementioned. Therefore, when the core body main body part 41B of the core body 4B is press fitted into the base member 45 in the manner of penetrating the through-hole 45a of the base member 45, as shown in FIGS. 6 and 7(E), the core body main body part 41B is fitted in the base member 45 as aforementioned, and its tip portion is fitted in the recess hole 6Ba provided in the end face of the ferrite core 6B. In this case, since the base member 45 in this example is fixed by adhesion to the end face of the ferrite core 6B, the core body 4B is held by the base member 45 as aforementioned, even if the core body main body part 41B of the core body 4B is not held press-fitted in the recess hole 6Ba of the ferrite core 6B. Therefore, the dimensional accuracy of the recess hole 6Ba of the ferrite core 6B need not be so high as the dimensional accuracy of the through-hole 45a of the base member 45. Thus, it is sufficient for the recess hole 6Ba to be formed with such a dimensional accuracy that the core body main body part 41B of the core body 4B can be loosely fitted in the recess hole 6Ba.

It is to be noted, though, that in this second embodiment, since the core body main body part 41B of the core body 4B has the aforementioned corner portions (edge portions), the core body main body part 41B makes contact with the recessed or concaved fitting portion at multiple contact points and can securely fit to the recessed or concaved fitting portion through deformation of the corner portions (edge portions). Therefore, if the recess hole 6Ba of the ferrite core 6B is also formed so as to satisfy the aforementioned (Expression 1), the recess hole 6Ba can securely fit to the core body main body part 41B of the core body 4B. Accordingly, in the case where secure fit can be achieved between the recess hole 6Ba of the ferrite core 6B and the core body main body part 41B of the core body 4B, the base member 45 can be fixed to the end face of the ferrite core 6B, even if not adhered to the ferrite core 6B, by only passing the core body main body part 41B of the core body 4B through the through-hole 45a of the base member 45 and press fitting the core body main body part 41B into the recess hole 6Ba of the ferrite core 6B.

In this case, as shown in FIG. 7(E), a length (height) d1 of the pedestal part 43B in the axial direction (see FIGS. 7(B) and 7(C)) is set to be greater than the length d5 of the inner wall surface of the opening 21B of the case main body 2Ba in the axial direction, and is set so that the side peripheral surface of the pedestal part 43B keeps facing the inner wall surface of the opening 21B even when the core body 4B is moved together with the ferrite core 6B by a maximum amount in the axial direction. This makes it possible, like in the first embodiment, to avoid a situation in which the leading end part 44B of the core body 4B is worn through making frictional contact with the inner wall surface of the opening 21B.

Thus, according to the second embodiment as aforementioned, the core body 4B is not press fitted directly into the ferrite core but is held by use of the base member 45, whereby it is possible to realize a position pointing device 1B in which the core body 4B is insertable and detachable. In this case, according to the second embodiment, since it is unnecessary to provide the ferrite 6B with a penetration hole, the ferrite core 6B can be easily reduced in thickness (radial size), and the position pointing device 1B configured in a thinner (radially smaller) form.

In addition, a configuration is adopted wherein the cross-sectional shape of the through-hole 45a of the base member 45 is a circle, while the cross-sectional shape of the core body main body part 41b of the core body 4B is set so as to contact the circle at a plurality of corner (edge) portions, in this example, eight corner (edge) portions. Owing to deformation of these corner (edge) portions, the core body 4 can be securely fitted to the base member 45. In addition, the fit can be easily released.

Consequently, the position pointing device 1B in this second embodiment produces a remarkable effect in that it can be reduced in thickness (radial size) and, yet, the core body 4B is replaceable, like in the first embodiment.

[Configuration of Board Holder 3B and Pressure-sensing Components 7B]

As shown in FIG. 6, like the board holder 3 in the first embodiment, the board holder 3B has a pressure-sensing component holder part 3Ba (hereinafter referred to as the holder part 3Ba for short) on the core body 4B side, and has a printed circuit board mount part 3Bb formed to be continuous with the holder part 3Ba, on the opposite side from the core body 4B side.

Pressure-sensing components 7B in the second embodiment include a ferrite chip 701, a coil spring 702, and an elastic body, in this example, a silicone rubber 703. Note that the ferrite core 6B is an example of a first magnetic body, and the ferrite chip 701 is an example of a second magnetic body.

The ferrite chip 701, the coil spring 702, and the silicone rubber 703 which constitute the pressure-sensing components 7B are held by the holder part 3Ba in the state of being sequentially arranged along the direction from the side of the printed circuit board mount part 3Bb toward the core body 4B side. Furthermore, a printed circuit board 8B is mounted on the printed circuit board mount part 3Bb of the board holder 3B.

In the position pointing device 1B in this second embodiment, on a substrate surface 8Ba of the printed circuit board 8B there are provided a side switch 11, capacitors 12 and 13, other components and a conductor pattern, like in the first embodiment. In the second embodiment, however, unlike in the first embodiment, the printed circuit board 8B is not provided with an IC 14 or a peripheral circuit therefor. Not that as shown in FIG. 6, in the second embodiment, also, the printed circuit board 8B is not in contact with the inner wall surface of a case main body 2Ba but is separate from the inner wall surface in a condition where it is mounted and locked on the printed circuit board mount part 3Bb.

The ferrite core 6B is provided, on the opposite side from the core body 4B side, with a flange part 6Bb which is greater in diameter than a winding portion of a coil 5B, and the part of the flange portion 6Bb is locked by the holder part 3Ba, whereby the ferrite core 6B is held locked to the board holder 3B.

In the second embodiment, when a pressure (writing pressure) is applied to the leading end part 44B of the protruding member 42B of the core body 4B by the user of the position pointing device 1B, an end face of the flange portion 6Bb of the ferrite core 6B to which the core body 4B is connected is biased closer to the ferrite chip 701 against a biasing force of the coil spring 702, according to the pressure. According to this displacement, the inductance of the coil 5B is varied, whereby the phase (resonance frequency) of an electromagnetic wave transmitted from the coil 5B of the resonance circuit is varied.

When the pressure is further increased, the end face of the ferrite chip 701 comes into contact with the silicone rubber 703 and elastically biases the silicone rubber 703. As a result, the inductance of the coil 5B is varied with variation characteristics according to the modulus of elasticity of the silicone rubber 703, whereby the phase (resonance frequency) of an electromagnetic wave transmitted from the coil 5B of the resonance circuit is varied.

Note that in the second embodiment, the coil spring 702 is lower than the silicone rubber 703 in modulus of elasticity. Specifically, let a modulus of elasticity of the coil spring 702 be k1 and let a modulus of elasticity of the silicone rubber 703 be k2, then there is a relation of k1<k2. Therefore, the coil spring 702 is elastically deformed with a lower pressure, whereas the silicone rubber 703 is not elastically deformed unless a pressure higher than that for the coil spring 702 is applied thereto.

As a circuit configuration of the position detecting device 202B which performs position detection and writing pressure detection through electromagnetic induction coupling with the position pointing device 1B in this second embodiment, there can be applied conventionally known circuit configurations such as the one described in Japanese Patent Laid-Open No. 2010-129920, and, therefore, detailed description of such a circuit configuration is omitted herein.

Note that in the aforementioned second embodiment, the method of varying the inductance of the coil of the resonance circuit for detection of the writing pressure has resided in moving the ferrite as the first magnetic body relative to the ferrite chip as the second magnetic body according to the writing pressure applied, and, therefore, a configuration has been adopted in which the core body 4B is fitted to the ferrite core 6B as the first magnetic body by way of the base member 45.

However, as the method of varying the inductance of the coil of the resonance circuit for detection of the writing pressure, a configuration may also be adopted in which the ferrite chip as the second magnetic body is moved relative to the ferrite core as the first magnetic body according to the writing pressure applied. The present invention is applicable also to the case where the ferrite chip is moved in this manner. In that case, a configuration is adopted in which the core body 4B is fitted to the ferrite chip as the second magnetic body by way of the base member 45. In that case, also, that end face of the ferrite chip to which the base member is to be joined is formed with a recess hole into which the core body main body part 41B of the core body 4B is to be inserted.

[Third Embodiment]

A third embodiment of the position pointing device according to the present disclosure will be described below, referring to FIGS. 10 to 12(B). A position pointing device 1C in the third embodiment is an example of detection of a writing pressure according to a variation in capacitance, like in the first embodiment. In the following description of the third embodiment, the parts corresponding to the parts in the first embodiment are denoted by reference symbols obtained by adding a suffix C to the reference symbols used above.

In the third embodiment, particularly, pressure-sensing components 7C are configured by use of a semiconductor device generally called micro electro mechanical system (MEMS). In the following description, a pressure-sensing variable capacitance device using a MEMS will be referred to a capacitance type pressure-sensing semiconductor device (hereinafter referred to as pressure-sensing device). In this third embodiment, unlike in the aforementioned first and second embodiments, a core body 4C has a configuration wherein a core body main body part 41C is not integral with a pedestal part 43C of a protruding member 42C but is a separate body from the pedestal part 43C.

In the third embodiment, also, like in the first and second embodiments, a board holder 3C connected to a case cap 2Cb is housed in a case main body 2Ca, whereby the position pointing device 1C is assembled.

Figure 10:
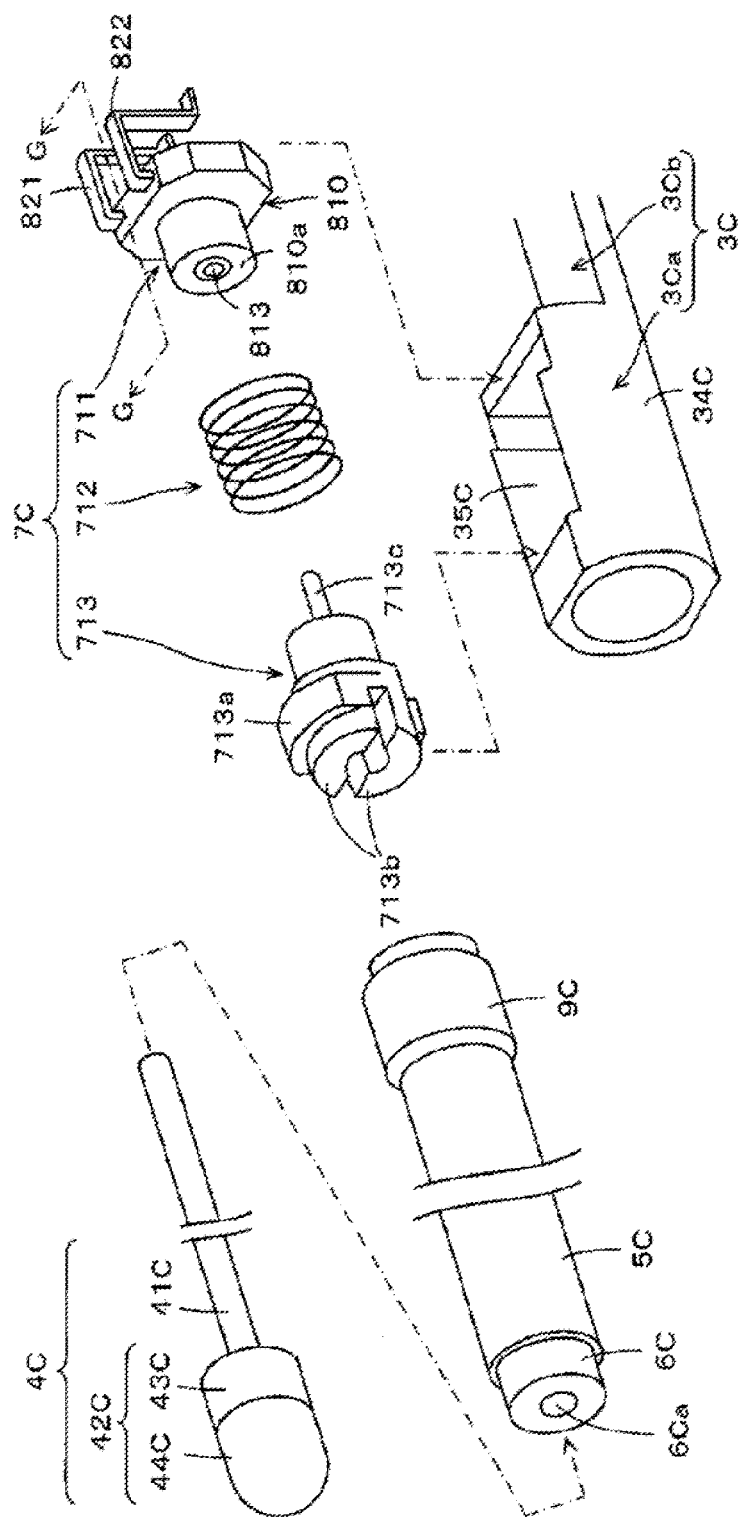
FIG. 10 is an exploded perspective view of part of a position pointing device according to a third embodiment the present disclosure.
Figure 11A:
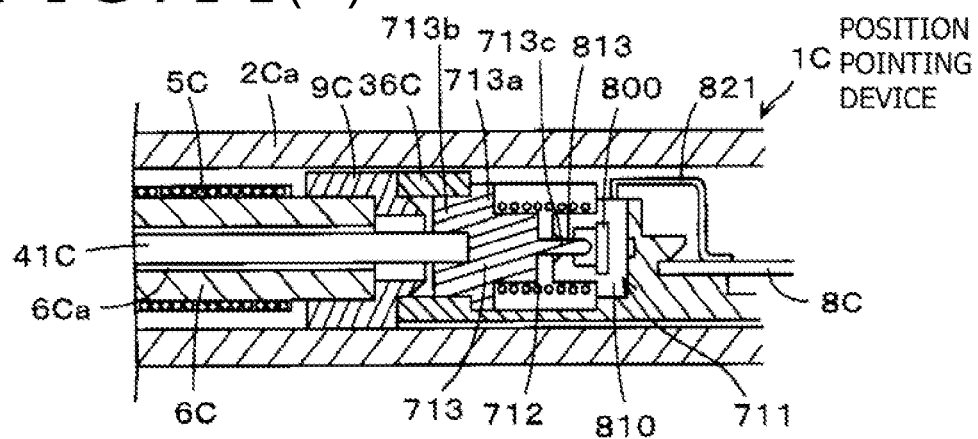
FIG. 11(A) is a sectional view of part of the position pointing device according to the third embodiment.
Figure 11B:
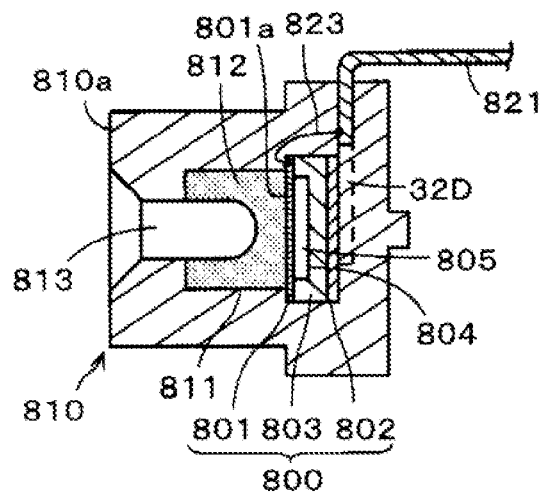
FIG. 11(B) is a sectional view of part of the position pointing device according to the third embodiment taken along line G-G in FIG. 10.

FIG. 10 shows a perspective view of the board holder 3C, particularly its part of a pressure-sensing component holder part 3Ca (hereinafter referred to as the holder part 3Ca for short), in the third embodiment and an exploded perspective view of pressure-sensing components 7C. FIG. 11(A) is a partially sectional view of the position pointing device 1C in the third embodiment, particularly showing the vicinity of the holder part 3Ca. FIG. 11(B) is a sectional view for explaining the configuration of a pressure-sensing device used in the third embodiment, and is a sectional view taken along line G-G of FIG. 10.

As depicted in FIG. 10, the pressure-sensing components 7C in the third embodiment include a pressure-sensing device 711, an elastic member 712 composed of a coil spring, and a retaining member 713.

The pressure-sensing device 11 in this example is, for example, a device in which a pressure-sensing chip 800 configured as a semiconductor device fabricated by MEMS technology is sealed in, for example, a cubic or rectangular-parallelepiped box-shaped package 810 (see FIGS. 10 and 11(B)).

The pressure-sensing chip 800 detects an applied pressure as a variation in capacitance, and, in this example, it has a configuration as shown in FIG. 11(B).

The pressure-sensing chip 800 in this example is in the shape of, for example, a rectangular parallelepiped measuring 1.5 mm (in length) by 1.5 mm (in width) by 0.5 mm (in height). As shown in FIG. 11(B), the pressure-sensing chip 800 in this example includes a first electrode 801, a second electrode 802, and an insulation layer (dielectric layer) 803 interposed between the first electrode 801 and the second electrode 802. In this example, the first electrode 801 and the second electrode 802 are each formed of a conductor composed of single crystalline silicon (Si).

The insulation layer 803 is formed, on the side of its surface opposed to the first electrode 801, with a circular recess 804 having a center positioned in the center of the surface. Due to the presence of the recess 804, a space 805 is defined between the insulation layer 803 and the first electrode 801.

In the pressure-sensing chip 800 configured in this way, a capacitance Cd is provided between the first electrode 801 and the second electrode 802. When a pressure is applied to the first electrode 801 from the side of its upper surface 801a on the opposite side from its surface facing the second electrode 802, the first electrode 801 is bent toward the space 805 side, whereby the distance between the first electrode 801 and the second electrode 802 is shortened, and the capacitance Cd is varied to a higher value. The amount of flexure of the first electrode 801 varies according to the magnitude of the pressure applied. Consequently, the capacitance Cd is a variable capacitance according to the magnitude of the pressure applied to the pressure-sensing chip 800.

In this example, an upper surface 810a, on the side of the upper surface 801a of the first electrode 801 adapted to receive a pressure in the pressure-sensing chip 800, of the package 810 is provided with a recess 811 formed so as to cover the area of that portion of the pressure-sensing chip 800 which receives a pressure. An elastic member 812 is placed to fill the recess 811. The package 810 is formed therein with a communication hole 813 ranging for communication from the upper surface 810a to part of the elastic member 812.

As shown in FIG. 10 and FIG. 11(B), from the package 810 of the pressure-sensing chip 800, a first lead terminal 821 connected with the first electrode 801 of the pressure-sensing chip 800 is led out, and a second lead terminal 822 connected with the second electrode 802 of the pressure-sensing chip 800 is led out. In this example, as depicted in FIG. 10 and FIG. 11(A), the first and second lead terminals 821 and 822 are soldered to a substrate surface of a printed circuit board 8C mounted on a printed circuit board mount part 3Cb of the board holder 3C.

The elastic member 712 is composed of the coil spring. The retaining member 713 is provided, on the core body 4C side in the axial direction thereof, with a ring-shaped projection 713a into which to press fit an end portion of the core body main body part 41C of the core body 4C, and is provided, on the opposite side in the axial direction thereof, with a bar-shaped projection 713c to be inserted in the communication hole 813 of the pressure-sensing device 711. The bar-shaped projection 713C is an element by which a writing pressure applied to the core body 4C is transmitted to the first electrode 801 of the pressure-sensing chip 800 by way of the elastic member 812 disposed inside the package 810 of the pressure-sensing device 711.

The holder part 3Ca of the board holder 3C is provided with an opening 35C which is formed at part of a side peripheral surface of a tubular body 34C constituting the holder part 3Ca and which is opening in a direction orthogonal to the axial direction of the board holder 3C. In this third embodiment, the pressure-sensing device 711, the elastic member 712 composed of the coil spring and the retaining member 713 which constitute the pressure-sensing components 7C are housed into the holder part 3Ca via the opening 35C from the direction orthogonal to the axial direction.

[Configuration Example of Core Body 4C in Third Embodiment]

As shown in FIG. 10 and FIG. 11(A), in the third embodiment, like in the first embodiment, the ferrite core 6C around which a coil 5C is wound is formed therein with a penetration hole 6Ca. The core body main body part 41C of the core body 4C is passed through the penetration hole 6Ca of the ferrite core 6C, and its end portion is press fitted into a fitting recess defined by a ring-shaped projection 713b of the retaining member 713.

Figure 12A:
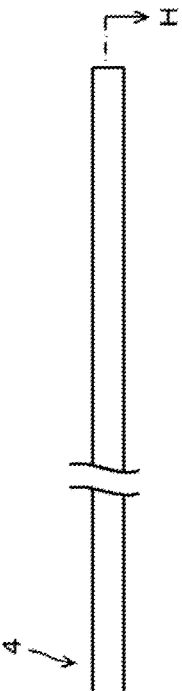
FIG. 12(A) is a plan view of a core body of the position pointing device according to the third embodiment.
Figure 12B:
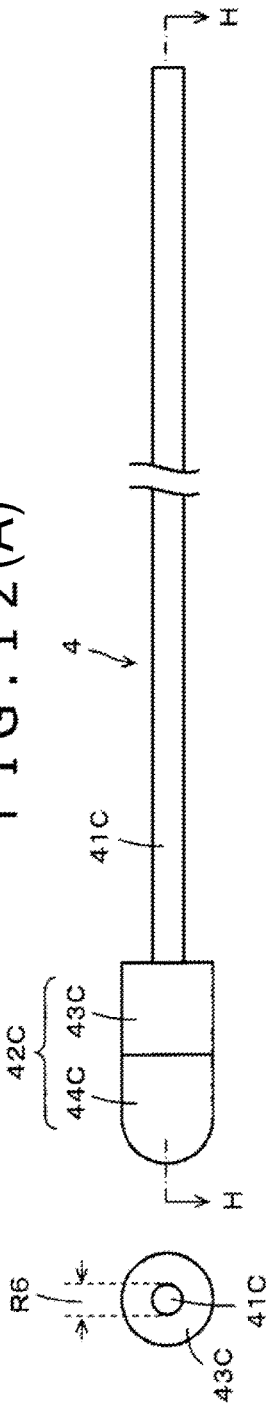
FIG. 12(B) is a sectional view of a pedestal part of the core body.
Figure 12C:
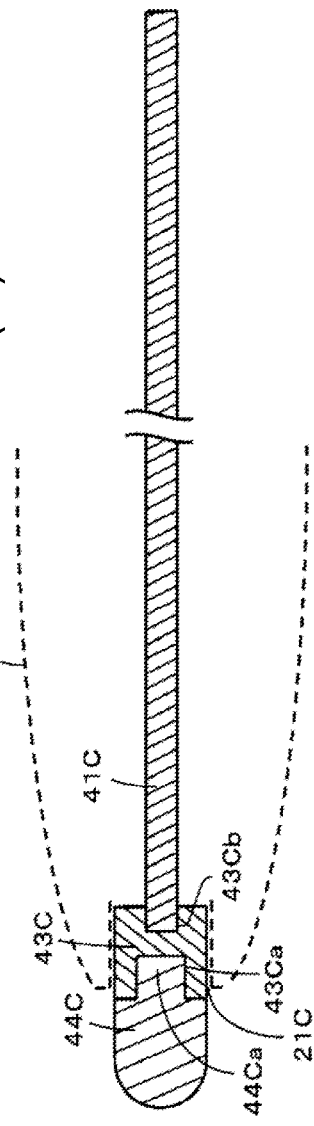
FIG. 12(C) is a sectional view of the core body taken along line H-H in FIG. 12(A)
Figure 12D:
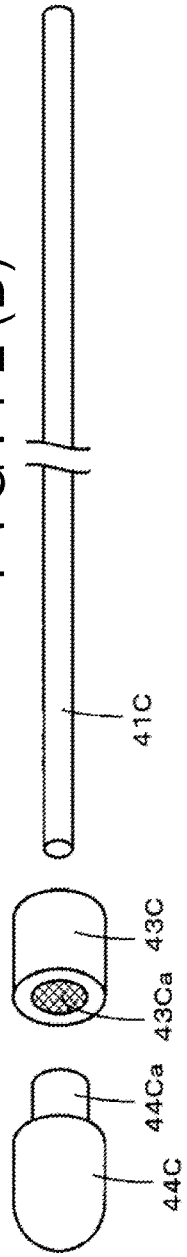
FIG. 12(D) is an exploded view of the core body.

FIGS. 12(A) to 12(D) show a configuration example of the core body 4C in the third embodiment. FIG. 12(A) is a side view of the core body 4C. FIG. 12(B) shows the core body 4C as viewed from the core body main body part 41C in the axial direction thereof. FIG. 12(C) is a sectional view (a longitudinal sectional view of the core body 4) taken along line H-H of FIG. 12(A). Further, FIG. 12(D) is a view for explaining a producing method for, and assembly of, the core body 4C in the third embodiment.

The core body main body part 41C in this example is in the shape of an elongate bar-shaped body circular in cross section, and has an outside diameter R6 smaller than the inside diameter of the penetration hole 6Ca of the ferrite core 6C. In the third embodiment, the core body main body part 41C is formed of a metal, and is a separate body from the pedestal part 43C of the protruding member 42C.

In the third embodiment, also, the protruding member 42C includes the pedestal part 43C and a leading end part 44C, and has a cannonball- or shell-like shape. In the third embodiment, also, like in the first embodiment, the protruding member 42C is formed by forming and connecting the pedestal part 43C and the leading end part 44C by welding, particularly, by two-color molding as an example of heat welding, in such a manner that a projection 44Ca formed in the leading end part 44C is fitted in a recess 43Ca provided in the pedestal part 43C. Besides, like in the first embodiment, the leading end part 44C is formed of an elastomer, preferably, a thermoplastic elastomer, whereas the pedestal part 43C is formed of a resin more rigid than the leading end part 44C, such as polycarbonate or ABS resin.

It is to be noted here that in the third embodiment, the pedestal part 43C is provided, in addition to a recess 43Ca in which to fit the projection 44Ca of the leading end part 44C, with a recess hole 43Cb having a diameter approximately equal to the diameter of the core body main body part 41C, in the center of its end face on the side opposite from the leading end part 44C side. One end portion of the core body main body part 41C is press fitted into the recess hole 43Cb of the pedestal part 43C connected with the leading end part 44C by the two-color molding to form the protruding member 42C, whereby the core body 4C is formed. In this case, the relationship among the hardnesses of the core body main body part 41C and the pedestal part 43C and the leading end part 44C is as follows.

[Hardness of leading end part 44C]<[Hardness of pedestal part 43]≤[Hardness of core body main body part 41C]

In forming the core body 4C in the third embodiment, first, the leading end part 44C having the projection 44Ca is molded from a thermoplastic elastomer as a primary material by use of a mold for molding the leading end part 44C. Thereafter, a secondary material, for example, polycarbonate is poured into a mold for molding the pedestal part 43C, to form the protruding member 42C including the pedestal part 43C having the recess hole 43Cb and the leading end part 44C by two-color molding, in such a manner that the projection 44Ca of the leading end part 44C is fitted in the recess 43Ca of the pedestal part 43C. Subsequently, an end portion on one side of the core body main body part 41C formed of a metal is press fitted, together with an adhesive, into the recess hole 43Cb of the pedestal part 43C. By this process, the core body 4C is formed.

Note that in performing the two-color molding as above, it is further preferable that joining surfaces of the projection 44Ca of the leading end part 44C for joining to the pedestal part 43C are preliminarily subjected to a graining process such as, for example, electric discharge graining, so that the leading end part 44C and the pedestal part 43C can be securely joined to each other. This applies also to the joining surfaces for joining between the core body main body part 41C and the recess hole 43Cb of the pedestal part 43C.

In the case of the core body 4C in this third embodiment, unlike the core bodies 4 and 4B in the first and second embodiments, the core body main body part 41C and the pedestal part 43C are separate members, and both of them are joined to each other with an adhesive. Therefore, there arises a problem as to the joint strength at the joint portion between the protruding member 42C and the core body main body part 41C, like in the example shown in FIGS. 19(A) and 19(B).

In the third embodiment, however, the protruding member 42C includes the leading end part 44C and the pedestal part 43C, and the pedestal part 43C can be formed of a rigid resin, whereby good affinity for the rigid core body main body part 41C is ensured. Therefore, the joint strength between the core body main body part 41C and the pedestal part 43C of the protruding member 42C is remarkably enhanced, as compared with the case where a rigid core body main body part 112 is joined directly to a leading end part 111 composed of an elastic member, as in the example shown in FIGS. 19(A) and 19(B). In addition, like in the first and second embodiments, the leading end part 44C composed of the elastic member and the pedestal part 43C are joined to each other more firmly owing to an increased joint area, as compared with the case where the rigid core body main body part 112 is joined directly to the leading end part 111 composed of the elastic member. Consequently, it is possible to avoid a situation where the leading end part 44C comes off the pedestal part 43C.

In this third embodiment, also, as indicated by broken line in FIG. 12(B), the pedestal part 43C of the protruding member 42C is facing an opening 21C of the case main body 2Ca, so that the flexible leading end part 44C can be prevented from making contact with the case main body 2Ca.

Besides, in the third embodiment, as shown in FIG. 12(B), the length (length in the axial direction) of the core body main body part 41C is so set that in the condition where the core body 4 is housed in the case main body 2Ca, the joint portion between the core body main body part 41C and the pedestal part 43C keeps remaining inside the case main body 2Ca even when the core body 4 is moved in the axial direction by a writing pressure.

Since the core body main body part 41C and the protruding member 42C are separate bodies from each other, the protruding member 42C may come off the core body main body part 41C. Since the length of the core body main body part 41C is selected as aforementioned, however, the core body main body part 41C would not protrude from the opening 21C of the case main body 2Ca to the exterior even in such a situation. Accordingly, the core body main body part 41C would not mar an input surface of an electronic apparatus on which inputting with the position pointing device is performed.

Note that in the third embodiment, the portions of the pedestal part 43C and the core body main body part 41C which are separate bodies from each other may also be formed by welding, particularly by two-color molding as an example of heat welding. In that case, since the pedestal part 43C and the core body main body part 41C are welded together, better affinity is ensured, and the pedestal part 43C can be more securely prevented from coming off the core body main body part 41C. Note that in that case, the leading end part 44C and the pedestal part 43C may be joined to each other by other joining method, such as other welding than the two-color molding.

Next, in the condition where the ferrite core 6C has been connected to the holder part 3Ca of the board holder 3C as above, the core body main body part 41C of the core body 4C is inserted into and passed through the penetration hole 6Ca of the ferrite core 6C. Then, an end portion of the core body main body part 41C of the core body 4C is press fitted into the ring-shaped projection 713b of the retaining member 713 housed in the holder part 3Ca.

Thus, in this third embodiment, also, the printed circuit board 8C is mounted on the printed circuit board mount part 3Cb of the board holder 3C connected to the case cap 2Cb, and the pressure-sensing components 7C are housed in the holder part 3Ca. Further, the ferrite core 6C is connected to the holder part 3Ca, and the core body 4C is connected, whereby a module part can be formed.

Subsequently, the module part is inserted in the cavity of the case main body 2Ca in such a manner that the whole body of the leading end part 44C of the protruding member 42C of the core body 4C and part of the pedestal part 43C are exposed by protruding from the opening 21C of the case main body 2Ca to the exterior, and the case main body 2Ca and the case cap 2Cb are coupled to each other, to complete the position pointing device 1C.

In this position pointing device 1C, when a pressure is exerted on the leading end part 44C of the protruding member 42C of the core body 4C, the core body 4C is displaced in the direction of the inside of the case main body 2Ca along the axial direction, according to the pressure. The displacement of the core body 4C causes the retaining member 713 inside the holder part 3Ca connected with the core body 4C through the core body main body part 41C to be displaced toward the pressure-sensing device 711 side against an elastic biasing force of the elastic member 712. Then, the first electrode 801 of the pressure-sensing chip 800 inside the pressure-sensing device 711 is depressed by the bar-shaped projection 713c of the retaining member 713. As a result, the capacitance between the first electrode 801 and the second electrode 802 of the pressure-sensing chip 800 is varied according to the pressure applied to the core body 4C.

In this case, a pressure-receiving surface of the pressure-sensing chip 800 is not pressed directly by the bar-shaped projection 713c serving as a pressing member, but, instead, the pressing is performed by way of the elastic member 812. Therefore, pressure resistance on the side of the pressure-receiving surface of the pressure-sensing chip 800 is enhanced, and breakage of the pressure-sensing chip 800 on the side of the pressure-receiving surface can be prevented from occurring.

In addition, the bar-shaped projection 713c is positioned by being inserted into the communication hole 813 provided in the package 810 of the pressure-sensing chip 800, so that the pressure applied by the bar-shaped projection 713 is reliably exerted on the pressure-sensing chip 800 by way of the elastic member 812.

The pressure-sensing chip 800 in this example is of a very small type as aforementioned, so that the position pointing device can be easily reduced in thickness (radial size). Besides, this fourth embodiment has also a merit that the configuration thereof is very simple.

Note that as a circuit configuration of the position pointing device 1C in this third embodiment and a circuit configuration of the position detecting device to be used with the position pointing device 1C, there can be used those shown in FIGS. 5(A) to 5(D) and described in the first embodiment.

[Other Embodiments or Modifications]
<Other Configuration Examples of Protruding Member of Core Body>

In the aforementioned embodiments, the protruding member 42, 42B, or 42C of the core body 4, 4B, or 4C has been so configured that the projection 44a, 44Ba, or 44Ca is provided on the side of the leading end part 44, 44B, or 44C, whereas the recess 43a, 43Ba, or 43Ca is formed on the side of the pedestal part 43, 43B, or 43C, and both of them are formed in a fitted state by two-color molding. However, a configuration may be adopted in which a projection is provided on the side of the pedestal part of the protruding member of the core body, and a recess is provided on the side of the leading end part. In this case, also, like in the cases of the protruding members 42, 42B, or 42C of the core bodies 4, 4B, or 4C in the aforementioned embodiments, the joint area between the leading end part and the pedestal part is increased and, therefore, the joint strength is enhanced, as compared with the case where the leading end part and the pedestal part are joined together at a flat surface.

Figures 13A, 13B, 13C:
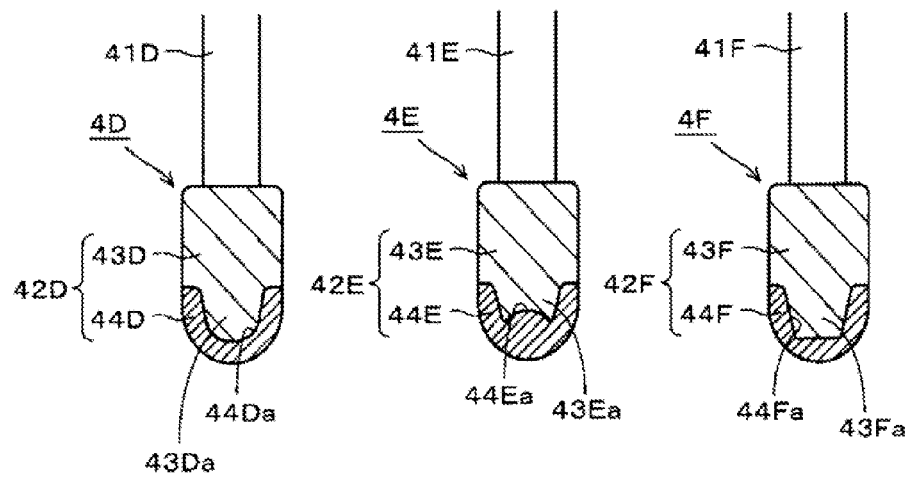
FIGS. 13(A), 13(B), and 13(C) are sectional views of a core body according to another embodiment of the present disclosure.

FIGS. 13(A) to 13(C) show some examples of a core body having a protruding part in other configuration examples. In FIGS. 13(A) to 13(C), only protruding members of core bodies are depicted in section. The configuration of the core body as a whole may be any of those of the aforementioned core bodies 4, 4B, and 4C.

In a protruding member 42D of a core body 4D in an example shown in FIG. 13(A), a leading end part 44D having an outer surface in a dome-like, hemispherical or spindle-like shape or the like shape is provided, in its end face on the side of connection with a pedestal part 43D, with a recess 44Da having an inner wall surface similar in shape to the outer surface of the leading end part 44D. In this case, the leading end part 44D is a thin-walled member having a substantially constant material thickness. On the other hand, the pedestal part 43D of the protruding member 42D is provided, at its end face on the side of connection with the leading end part 44D, with a projection 43Da having a shape for fitting into the recess 44Da. Like in the aforementioned embodiments, the leading end part 44D and the pedestal part 43D are formed in a joined state by two-color molding, to form the protruding member 42D.

In a protruding member 42E of a core body 4E in an example shown in FIG. 13(B), a pedestal part 43E is provided, at its end face on the side of connection with a leading end part 44E, with a projection 43Ea having a caldera-shaped recess in a conical summit portion. On the other hand, the leading end part 44E is provided, in its face on the side of connection with the pedestal part 43E, with a recess 44Ea having a shape corresponding to the projection 43Ea of the pedestal part 43E. Like in the aforementioned embodiments, the leading end part 44E and the pedestal part 43E are formed in a joined state by two-color molding, to form the protruding member 42E.

Further, in a protruding member 42F of a core body 4F in an example shown in FIG. 13(C), a pedestal part 43F is provided, at its end face on the side of connection with a leading end part 44F, with a projection 43Fa having a truncated conical shape. On the other hand, the leading end part 44F is provided, in its end face on the side of connection with the pedestal part 43E, with a recess 44Fa having a shape corresponding to the projection 43Fa of the pedestal part 43F. Like in the aforementioned embodiments, the leading end part 44F and the pedestal part 43F are formed in a joined state by two-color molding, to form the protruding member 42F.

Note that the configuration of the core body main body part 41D, 41E, or 41F in each example and the joining relationship between the core body main body part 41D, 41E, or 41F and the pedestal part 43D, 43E, or 43F in each example are the same as those in the aforementioned first, second, and third embodiments, as mentioned above. In the examples shown in FIG. 13(A) to 13(C), also, the materials for the core body main body parts 41D, 41E, and 41F, the pedestal parts 43D, 43E, and 43F and the leading end parts 44D, 44E, and 44F are the same as those in the aforementioned embodiments.

In the cases of FIG. 13(B) and FIG. 13(C), the leading end part 44D has an outer surface having a dome-like, hemispherical or spindle-like shape or the like shape, so that its material thickness corresponds to the shape of the recess 44Da, but the leading end part 44D is a thin-walled member, like in the case of FIG. 13(A). With the leading end parts 44D, 44E, and 44F thus configured as thin-walled members, wear resistance in the case where the leading end part 44D, 44E, or 44F is formed of a soft material can be enhanced.

Figure 14A:
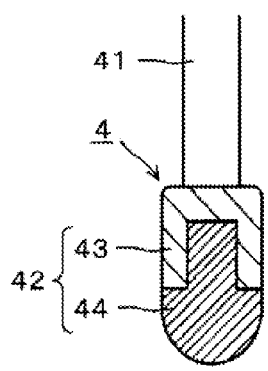
FIG. 14(A) is a sectional view a core body according to a further embodiment of the present disclosure.
Figure 14B:
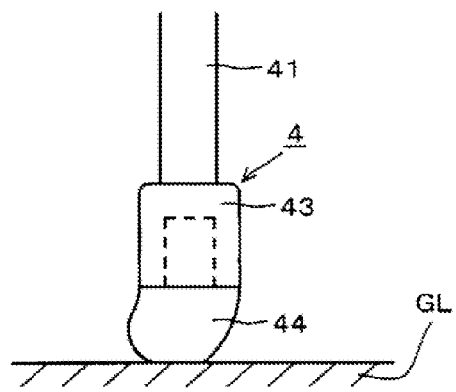
FIG. 14(B) is a plan view of the core body shown in FIG. 14(A).

There are cases where a material for the leading end parts 44, 44B to 44F of the core bodies 4, 4B to 4F is required to be as soft as possible, taking into account the so-called feel of a pen when used. In the case where such a soft material is used for the leading end part, for example in the case of the core body 4 shown in FIG. 14(A), the material thickness of the leading end part 44 is large and, accordingly, the distance from the portion of contact between an operating surface (input surface) GL of a position pointing device (such as a glass surface) and the leading end part 44 to the rigid pedestal part 43 is also long, so that the leading end part 44 is bent and the area of contact between the operating surface GL and the leading end part 44 is thereby enlarged, as illustrated in FIG. 14(B). When the area of contact between the leading end part 44 and the operating surface GL is thus enlarged, the leading end part 44 will be worn more easily.

On the other hand, in the cases of the core bodies 4D to 4F in the examples shown in FIG. 13(A) to 13(C), the leading end parts 44D to 44F are configured as thin-walled members as aforementioned and, hence, the distance from the contact portion between the operating surface GL and one of the leading end parts 44D to 44F to one of the rigid pedestal parts 43D to 43F is also short, so that the area of contact between the operating surface GL and the leading end part 44 is reduced as compared with the cases of the core bodies 4, 4B, and 4C in the aforementioned first to third embodiments. As a result, the leading end parts 44D to 44F are less susceptible to wearing due to contact with the operating surface. Thus, even where the leading end parts 44D to 44F are formed of a comparatively soft material, they can be restrained from wearing.

<Others>

In the embodiments above, the pedestal part and the leading end part constituting the protruding member have been formed by two-color molding. However, the pedestal part and the leading end part may be joined to each other by means of adhesion or the like, instead of the two-color molding.

[Fourth Embodiment: Capacitance Type Position Pointing Device]

All the core bodies in the aforementioned embodiments correspond to the case of application to a core body of a position pointing device such that a position detecting device detects the pointed position by an electromagnetic induction system. However, the core bodies are applicable also to a core body of a position pointing device such that a position detecting device detects a pointed position by a capacitance system and has a function to detect a writing pressure.

Figures 15A, 15B:
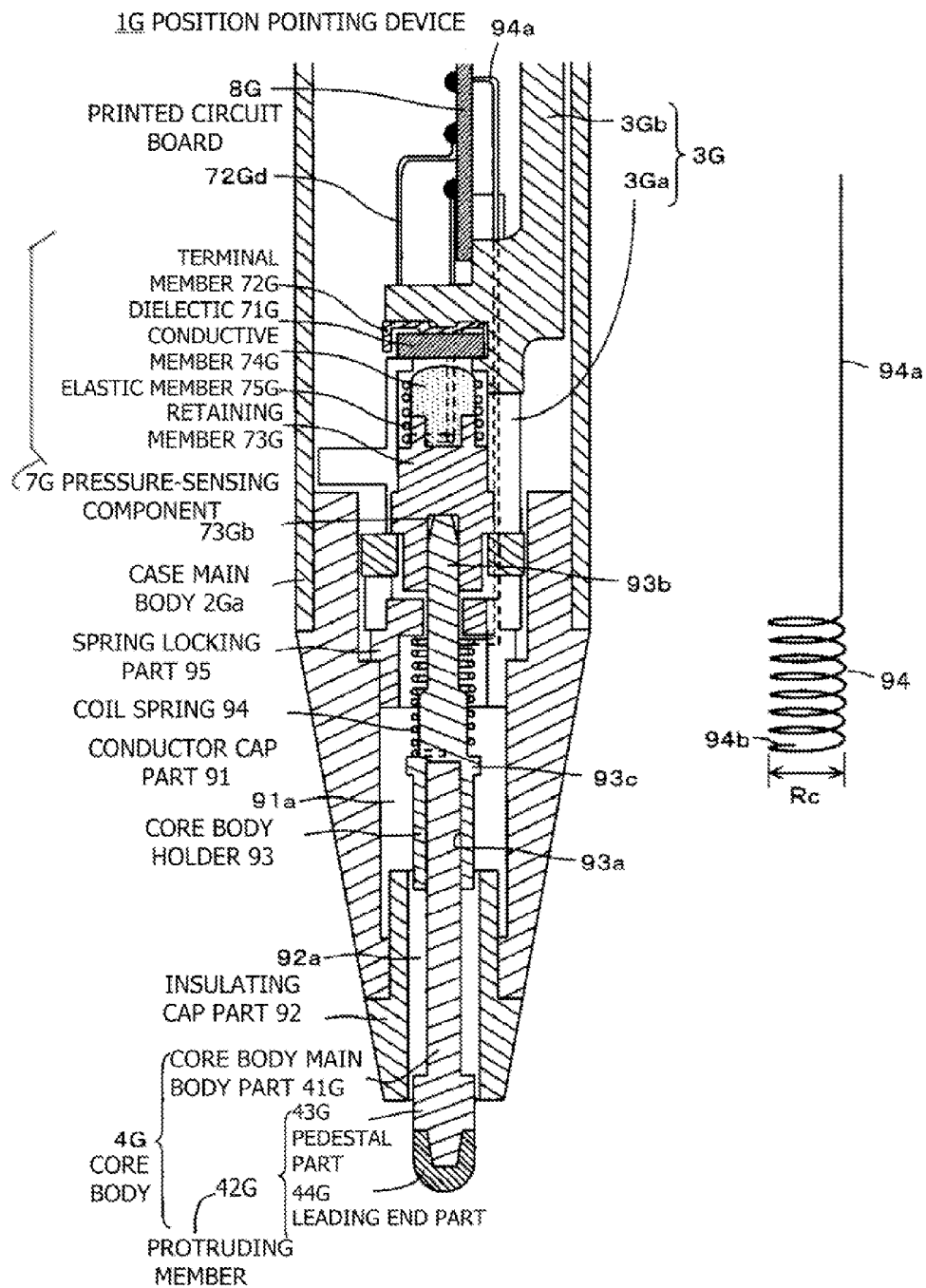
FIG. 15 is a sectional view of part of a position pointing device according to a fourth embodiment of the present disclosure.
Figure 16A:
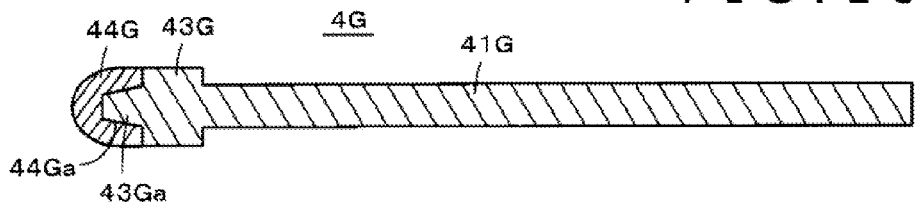
FIGS. 16(A), 16(B), and 16(C) are sectional views a core body of the position pointing device according to the fourth embodiment.
Figure 16B:
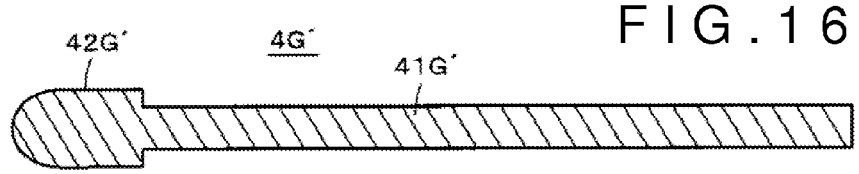
Figure 16C:
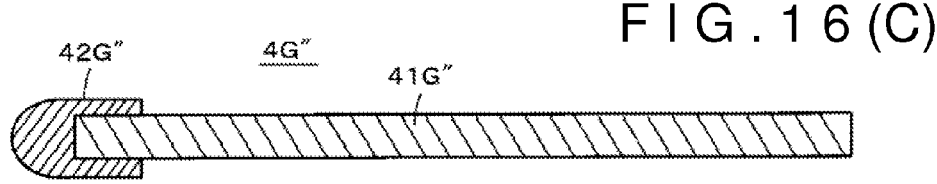
Figure 17:
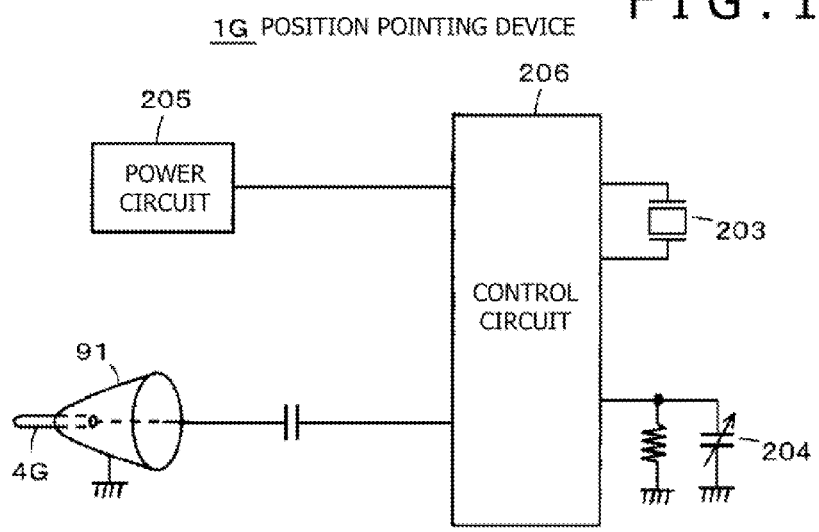
FIG. 17 is a schematic diagram of the position pointing device according to the fourth embodiment.
Figure 18:
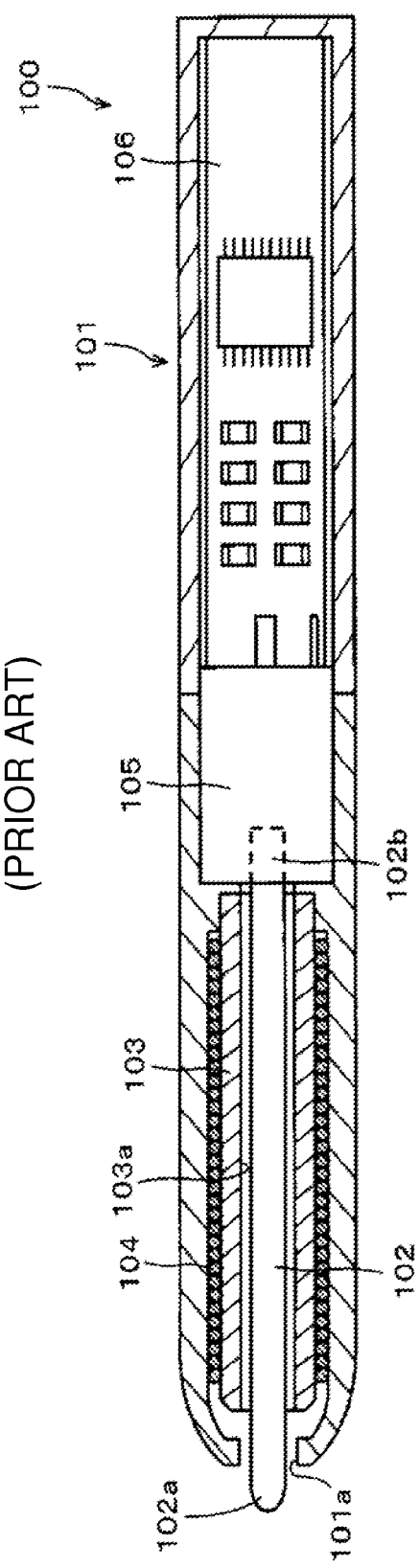
FIG. 18 is a sectional view of a conventional position pointing device.

FIG. 15(A) is a sectional view showing a core body 4G side of a position pointing device 1G according to this fourth embodiment, and FIG. 15(B) is a view showing an example of some of components of the position pointing device 1G. Also, FIGS. 16(A) to 16(C) are views for explaining a configuration example of the core body 4G of the position pointing device 1G in the fourth embodiment. Further, FIG. 17 is a view for explaining an electric circuit configuration of the position pointing device 1G in the fourth embodiment. Note that in the position pointing device 1G according to the fourth embodiment, the parts corresponding to the parts in the position pointing device 1 according to the first embodiment are denoted by reference symbols obtained by adding a symbol G to the reference symbols used above.

The position pointing device 1G in this fourth embodiment is of the so-called active electrostatic pen type. The position pointing device 1G has an oscillating circuit inside a casing, and has a configuration wherein an alternating current (AC) signal from the oscillating circuit is outputted from a core body 4G to a position-detecting sensor (omitted in the drawings). Therefore, the core body 4G of the position pointing device 1G in the fourth embodiment is configured to be electrically conductive.

As shown in FIG. 17, the position pointing device 1G includes a power circuit 205, a control circuit 206, a crystal unit 203, and a variable capacitor 204 composed of pressure-sensing components 7G as described later, as electric circuit components. The power circuit 205, in this example, includes an electric cell or battery. Note that the power circuit 205 may include an electric double layer capacitance which is charged by an electromagnetic induction signal sent from the position-detecting sensor.

The control circuit 206 is composed of an integrated circuit (IC) actuated by a power supply voltage from the power circuit 205. The IC, provided with an oscillating circuit having the crystal unit 203 at part of a resonance circuit, outputs an oscillation signal with a predetermined frequency. The control circuit 206 outputs the oscillation signal of the predetermined frequency to the position-detecting sensor by way of the conductive core body 4G. In this case, in the periphery of the conductive core body 4G is provided a conductive conductor cap part 91 which is electrically insulated from the core body 4G. The conductor cap part 91 is earthed, for example, through a conductive case main body of the position pointing device 1G and a human body, whereby the oscillation signal is supplied as an unbalanced signal to the position-detecting sensor.

The position-detecting sensor searches and detects the position of a conductor which receives the AC signal from the position pointing device 1G, from among a plurality of conductors, so as to detect the position pointed by the position pointing device 1G.

In addition, the control circuit 206 is connected with the variable capacitor 204 composed of the pressure-sensing components 7G to be described later. The variable capacitor 204 has a capacitance according to a writing pressure exerted on the core body 4G. The control circuit 206 detects the writing pressure being exerted on the core body 4G by detecting a signal according to the capacitance of the variable capacitor 204, and generates a digital signal (for example, an 8-bit digital signal) according to the writing pressure.

In a period different from a period in which the oscillation signal for detection by the position-detecting sensor of the position pointed by the position pointing device 1G is supplied from the control circuit 206, the control circuit 206 produces an amplitude-modulated signal by, for example, switching on and off the oscillation signal in accordance with the digital signal generated, and transmits a digital signal according to the writing pressure to the position-detecting sensor by using the amplitude-modulated signal. Specifically, for example, when a certain bit in an 8-bit digital signal is "1," an oscillation signal of a predetermined amplitude is outputted over the period corresponding to the bit. When a certain bit is "0," on the other hand, the outputting of the oscillation signal is halted (the amplitude of the oscillation signal is kept at zero) over the period corresponding to this bit. In this manner, the oscillation signal is amplitude modulated, whereby the 8-bit digital signal is transmitted to the position-detecting sensor.

The position-detecting sensor receives the amplitude-modulated signal of the oscillation signal, and demodulates the amplitude-modulated signal, so as to detect the writing pressure represented by the 8-bit digital signal. Note that immediately before the 8-bit amplitude-modulated signal, for example, the oscillation signal is sent as a burst signal for a predetermined period of time, and the burst signal is detected as a start bit by the position-detecting sensor, whereby the 8-bit writing pressure signal can be detected.

An example of the structure of the position pointing device 1G according to the fourth embodiment will be described below, referring to FIGS. 15 and 16(A) to 16(C).

As depicted in FIG. 15(A), in the position pointing device 1G in the fourth embodiment, a tubular case main body 2Ga is formed of a conductive material, for example, steel special use stainless (SUS). In an opening possessed by the tubular case main body 2Ga on the side where the core body 4G is provided, part of a conductive cap part 91 is press fitted. By the press fit, the conductive case main body 2Ga and the conductive cap part 91 are electrically connected with each other. When an operator of the position pointing device 1G holds the case main body 2Ga and performs a position pointing operation, the case main body 2Ga and the conductive cap part 91 are connected to earth through the human body.

As shown in FIG. 15(A), the conductive cap part 91 is in the shape of a truncated cone, and has a cavity 91a in a direction along the center line thereof. Into a tapered opening end of the conductive cap part 91, part of an insulating cap part 92 for electrically insulating a conductive core body 4G from the conductive cap part 91 is press fitted. The insulating cap part 92 has a truncated conical shape similar to the conductive cap part 91, and has a cavity 92a having an inside diameter slightly greater than the outside diameter of a protruding member 42G of the core body 4G, in a direction along the center line thereof. As will be described later, the core body 4G is inserted in the cavity 92a of the insulating cap part 92 in a slidable manner.

In the position pointing device 1G in this fourth embodiment, also, a board holder 3G including a holder part (pressure-sensing component holder part) 3Ga and a printed circuit board mount part 3Gb is housed in a cavity of the case main body 2Ga. Like the board holder 3 in the first embodiment, the board holder 3G is made to be immovable in the axial direction by a structure wherein its one end portion in the axial direction is connected to a case cap 2b (see FIG. 4(B)).

A printed circuit board 8G is mounted on the printed circuit board mount part 3Gb of the board holder 3G. The printed circuit board 8G is locked by a locking piece 33 (see FIG. 4(B)) formed at an end face 3c of the case cap 2b, thereby being locked on the printed circuit board mount part 3Gb. The printed circuit board 8G is formed thereon with a printed wiring pattern, and the power circuit 205, the control circuit 206, and the crystal unit 203 shown in FIG. 17 and other circuit components are mounted on the printed circuit board 8G in the state of being electrically connected to the printed wiring pattern.

Pressure-sensing components 7G configured similarly to the pressure-sensing components 7 in the first embodiment are housed in the holder part 3Ga of the board holder 3G. Specifically, as shown in FIG. 15(A), the pressure-sensing components 7G include a plurality of components, namely, a dielectric 71G, a terminal member 72G, a retaining member 73G, a conductive member 74G, and an elastic member 75G. The terminal member 72G constitutes a first electrode of a variable capacitor 204 composed of the pressure-sensing components 7G. The conductive member 74G and the elastic member 75G are electrically connected with each other, to constitute a second electrode of the variable capacitor 204.

As has been described in the first embodiment, in the pressure-sensing components 7G, a pressure (writing pressure) applied to the core body 4G is transmitted to the retaining member 73G. According to the pressure thus transmitted, the retaining member 73G biases the conductive member 74G toward the dielectric 71G side in the axial direction against a biasing force of the elastic member 75G, whereby the area of contact between the conductive member 74G and the dielectric 71G is varied according to the pressure transmitted to the retaining member 73G. Since the capacitance of the variable capacitor 204 composed of the pressure-sensing components 7G is varied according to the area of contact between the conductive member 74G and the dielectric 71G, the capacitance is brought to a value according to the pressure transmitted to the retaining member 73G.

In the fourth embodiment, the core body 4G is not fitted directly into a recess hole 73Gb in the retaining member 73G of the pressure-sensing components 7G but is fitted to the recess hole 73Gb by way of a core body holder 93. The core body holder 93 is formed of a conductive metal, for example, SUS, and has a rod-like overall shape. The core body holder 93 is provided, on one side in the axial direction thereof, with a recess hole 93a in which to fit the core body main body part 41G of the core body 4G in an insertable and detachable manner, and is provided, on the opposite side in the axial direction, with a projection 93b to be fitted in the recess hole 73Gb in the retaining member 73G of the pressure-sensing components 7G. Furthermore, the core body holder 93 is provided with a flange portion 93c at an intermediate portion in the axial direction thereof.

On the other hand, in the fourth embodiment, a coil spring 94 (see FIG. 15(B)) is provided which has a coil inside diameter Rc greater than the maximum value of the outside diameter of the core body holder 93 on the projection 93b side and smaller than the outside diameter of the flange portion 93*c*. The coil spring 94 is formed of a conductive material, for example, a conductive metal.

In the condition where the coil spring 94 is mounted onto the projection 93*b* side of the core body holder 93, the projection 93*b* of the core body holder 93 is fitted into the recess hole 73Gb of the retaining member 73G of the pressure-sensing components 7G. Note that in this fourth embodiment, an end portion 94*b* on the flange portion 93*c* side of the coil spring 94 is bent to the inner side, as shown in FIG. 15(B), so that when the end portion 94*b* is fitted into a hole (omitted in the drawing) bored in the core body holder 93 in the vicinity of the flange portion 93*c*, electrical connection between the conductive coil spring 94 and the conductive core body holder 93 is established assuredly. On the other hand, an end portion 94*a* of the coil spring 94 on the opposite side from the flange portion 93*c* is extended rectilinearly to the printed circuit board mount part 3Gb side, through a through-hole and/or gap (omitted in the drawing) formed in the board holder 3G in this example, and is electrically connected at its extension portion to a circuit component part of the printed circuit board 8G.

In addition, as shown in FIG. 15(A), the holder part 3Ga of the board holder 3G is provided with a spring locking part 95 at an opening on the core body 4G side thereof. An end portion of the coil spring 94 on the opposite side from the flange portion 93*c* is abutted on the spring locking part 95, whereby the position of the coil spring 94 is constrained in the axial direction.

In this way, the core body 4G is held by being fitted in the core body holder 93, and the projection 93*b* of the core holder 93 is fitted in the recess hole 73*b* of the retaining member 73, whereby the core body 4G is connected to the pressure-sensing components 7G. In this connected condition, a signal from the control circuit 206 provided on the printed circuit board 8G is supplied through the coil spring 94 and the core body holder 93 to the conductive core body 4G, and is transmitted from the core body 4G to a position-detecting sensor.

In the position pointing device 1G in the fourth embodiment, when no pressure is applied to the core body 4G, an elastic biasing force toward the core body 4G side is exerted on the retaining member 73G by the elastic member 75G of the pressure-sensing components 7G. Therefore, the core body 4G connected to the retaining member 73G through the core body holder 93 also receives an elastic biasing force exerted thereon in a direction from the core body main body part 41G side toward the leading end part 44G side.

In the fourth embodiment, due to the presence of the coil spring 94, it is ensured that even when a pressure (writing pressure) is exerted on the core body 4G, the pressure exerted on the core body 4G is not transmitted to the pressure-sensing components 7G until a predetermined pressure high enough to cause the coil spring 94 to start biasing is exerted on the core body 4G. In other words, in regard of detection of a writing pressure, the position pointing device 1G in the fourth embodiment has a dead band as to a pressure (writing pressure) lower than the predetermined pressure high enough to cause the coil spring 94 to start biasing. When a pressure equal to or higher than the predetermined pressure is exerted on the core body 4G, the writing pressure is transmitted through the retaining member 73G to bias the conductive member 74G in the axial direction, whereby the capacitance of the variable capacitor 204 constituting the pressure-sensing components 7G is varied according to the writing pressure.

As aforementioned, the control circuit 206 detects the signal according to the capacitance of the variable capacitor 204, thereby detecting the writing pressure, and generates a digital signal according to the writing pressure thus detected. In addition, the control circuit 206 supplies an amplitude-modulated signal according to the digital signal to the conductive core body 4G by way of the coil spring 94 and the core body holder 93, and the signal from the control circuit 206 is transmitted from the core body 4G to the position-detecting sensor.

The configuration of the core body 4G in the fourth embodiment will now be described below. As depicted in FIG. 15(A) and FIG. 16(A), the core body 4G in the fourth embodiment has a configuration wherein the pedestal part 43G, which constitutes the protruding member 42G together with the leading end part 44G, and the core body main body part 41G are integral with each other, and the leading end part 44G formed of a material different from the material of the pedestal part 43G is connected to the pedestal part 43G. In this case, the leading end part 44G is lower in hardness than, or more flexible than, the pedestal part 43G and the core body main body part 41G, like in the aforementioned embodiments.

The core body 4G is produced by a method similar to the forming method for the core body 4 in the first embodiment, except that the core body 4G is formed from a conductive material unlike the core body 4 in the first embodiment. For instance, as shown in FIG. 16(A), the core body main body part 41G and the pedestal part 43G are configured to be integral with each other. The pedestal part 43G, of the integral body including the core body main body part 41G and the pedestal part 43G, and the leading end part 44G are welded together, preferably, heat-welded together (for example, by two-color molding). It is to be noted here that, as shown in FIG. 16(A), in this fourth embodiment, a recess 44Ga is provided on the leading end part 44G side, and a projection 43Ga provided on the pedestal part 43G side is fitted in the recess 44Ga.

The core body main body part 41G and the pedestal part 43G are formed from a material which, in this example, is obtained by admixing (or mixing) a non-conductive predetermined resin with a predetermined amount of a conductive material, for example, a carbon powder to obtain a conductive material. Similarly, the leading end part 44G is also formed from a material which, in this example, is obtained by admixing (mixing) a predetermined resin with a predetermined amount of a carbon powder to obtain a conductive material.

In the case of this example, the resin contained in the conductive material constituting the core body main body part 41G and the pedestal part 43G and the resin contained in the conductive material constituting the leading end part 44G are different resin materials. In addition, the resin material of the leading end part 44G is lower in hardness than, or more flexible than, the resin material of the pedestal part 43G and the core body main body part 41G. Examples of the resin contained in the conductive material constituting the core body main body part 41G and the pedestal part 43G include ABS, POM, and PC, whereas examples of the resin contained in the conductive material constituting the leading end part 44G include POM and elastomers.

It is to be noted that in this example, the resin material contained in the conductive material constituting the core body main body part 41G and the pedestal part 43G and the resin material contained in the conductive material constituting the leading end part 44G are selected to be different so as to realize the difference in hardness, but other methods may also be adopted. For example, the same resin material may be used while changing the amount of the carbon powder as an example of the conductive material to be mixed into the resin material, and different conductive materials may be used. Where different conductive materials are used as the conductive material to be mixed into the resin material, the respective amounts of the different conductive materials to be mixed into the resin may not necessarily be equal.

In the position pointing device 1G in the fourth embodiment described above, also, the core body 4G is connected to the pressure-sensing component 7G via the core body holder 93 in an insertable and detachable manner, so that the core body 4G is replaceable. In this case, the core body 4G is insertable into and detachable from the pressure-sensing component 7G together with the core body holder 93, but, since the core body 4G is also insertable into and detachable from the core body holder 93, it is sufficient to replace the core body 4G alone.

According to the configuration of the core body 4G in the fourth embodiment described above, like in the aforementioned embodiments, a plurality of different materials for the leading end part 44G can be easily provided. Therefore, like in the aforementioned first to third embodiments, by adopting resin materials exhibiting various hardnesses and material feelings as the resin material for constituting the leading end part 44G, it is possible to configure a core body 4G which can realize a variety of feels of a pen when used. It is natural that according to the core body 4G in the fourth embodiment described above, the other effects obtained from the aforementioned first to third embodiments can also be obtained.

In addition, since the position pointing device 1G in the fourth embodiment is an electrostatic type electronic pen, it is unnecessary for the core body main body part 41G of the core body 4G to be inserted or passed in or through, or fitted in, a center hole of the ferrite core, unlike in the case of the electromagnetic induction type position pointing devices in the aforementioned first to third embodiments. Therefore, the core body main body part 41G of the core body 4G can be formed to be greater in thickness (radial size) than the core body main body parts of the core bodies in the aforementioned first to third embodiments. Furthermore, in this fourth embodiment, the core body 4G is fitted into the retaining member 73G of the pressure-sensing components 7G by way of the core body holder 93. Therefore, the core body main body part 41G of the core body 4G can be shortened in length, as well.

From the foregoing it is seen that in the fourth embodiment, the core body main body part 41G of the core body 4G can transmit the writing pressure to the pressure-sensing components 7G, notwithstanding it is more flexible than the core body main body parts of the core bodies in the cases of the aforementioned first to third embodiments. Therefore, the core body in the fourth embodiment can be a core body 4G' wherein a protruding member 42G' and a core body main body part 41G' are formed as one body from the same conductive material, as depicted in FIG. 16(B). Besides, the core body in the fourth embodiment may be a core body 4G" composed of a protruding member 42G" which has a pedestal part and a leading end part integral with each other, and a core body main body part 41G" which is formed of a material different from the material of the protruding member 42G" and harder than the protruding member 42G," as shown in FIG. 16(C). In the cases of the core body 4G' and the core body 4G" of the structures shown in FIG. 16(B) and FIG. 16(C), also, by adopting resin materials exhibiting various hardnesses and material feelings as the resin material for constituting at least the leading end part, it is possible to configure a core body 4G which can realize a variety of feels of a pen when used.

Thus, according to the position pointing device in the fourth embodiment as above, there can be provided an electrostatic type electronic pen with a remarkable configuration such that at least a leading end part can be selected to be any of those varying in hardness and material, while maintaining electric conductivity of a core body.

Note that in the aforementioned fourth embodiment, also, the pedestal part 43G and the leading end part 44G constituting the protruding member 42G have been formed by two-color molding, but the pedestal part 43G and the leading end part 44G may be connected to each other by means of adhesion or the like, instead of the two-color molding.

It is natural that the core body 4G in this fourth embodiment can also be provided with the configurations according to the examples (see FIGS. 5(A) to 5(D), 7(A) to 7(E), and 12(A) to 12(D)) and the configurations according to the modifications (see FIGS. 13(A) to 13(C) and 14(A) and 14(B)) which have been described in the first to third embodiments above. Therefore, the core body main body part may naturally be formed of a metal. In other words, the modifications and other embodiments of the core body described in regard of the electromagnetic induction type position pointing devices in the first to third embodiments are applicable also to the case of the core body of the capacitance type position pointing device in this fourth embodiment in the same manner, except that the material of the core body is a conductive material in this fourth embodiment.

The active electrostatic pen in the fourth embodiment as aforementioned has been of a type in which an oscillating circuit is provided in a casing. However, there is also a capacitance system active electrostatic pen of a type in which an oscillating circuit is not provided in a casing, a signal from a position-detecting sensor is obtained through electric field coupling, and the thus obtained signal is amplified and transmitted to the position-detecting sensor. The present invention is applicable also to an active electrostatic pen of such a type.

DESCRIPTION OF REFERENCE SYMBOLS 1, 1B, 1C, 1G . . . Position pointing device, 2 . . . Case, 2a . . . Case main body, 2b . . . Case cap, 4, 4B, 4C, 4G . . . Core body, 6, 6B, 6C . . . Ferrite core, 21, 21B, 21C . . . Opening, 41, 41B, 41C, 41G . . . Core body main body part, 42, 42B, 42C, 42G . . . Protruding member, 43, 43B, 43C, 43G . . . Pedestal part, 44, 44B, 44C, 44G . . . Leading end part, 7, 7B, 7C, 7G . . . Pressure-sensing components.

The invention claimed is:

1. A position pointing device comprising:
a core body;
a tubular casing provided, on one end in an axial direction thereof, with an opening via which one end in an axial direction of the core body is exposed to an exterior; and
a pressure detecting part which is provided inside the tubular casing and detects a pressure applied in the axial direction of the core body;
wherein the core body includes:
a leading end part formed of an elastic material,
a pedestal part formed of a material which is different from the elastic material of the leading end part and is harder than the elastic material of the leading end part, the pedestal part being positioned adjacent to the leading end part in the axial direction of the core body, and
a core body main body part positioned adjacent to the pedestal part in the axial direction of the core body, a thickness of the core body main body part being smaller than a thickness of the pedestal part in a direction orthogonal to the axial direction of the core body; and
the core body is housed in the casing in a state of being movable in the axial direction of the core body, such that the leading end part is exposed to the exterior via the opening of the casing and that a pressure exerted on the leading end part in the axial direction of the core body is transmitted to the pressure detecting part provided on an opposite side of the core body main body part from the pedestal part,
wherein the core body is disposed in a relation to the casing such that the leading end part is exposed by wholly protruding through the opening to the exterior and that a side surface of the pedestal part faces a surface of the opening of the casing, the side surface of the pedestal part and the surface of the opening of the casing extending in a direction along the axial direction of the core body.

2. The position pointing device according to claim 1, wherein a length of the side surface, in the direction along the axial direction of the core body, of the pedestal part is selected to be greater than a maximum amount the core body is moved in the axial direction of the core body when a pressure is exerted on the leading end part.

3. The position pointing device according to claim 1, wherein the pedestal part and the core body main body part are formed from a same material and integrally.

4. The position pointing device according to claim 1, wherein the core body main body part is formed from metal.

5. The position pointing device according to claim 4, wherein the leading end part and the pedestal part are formed from a conductive resin.

6. The position pointing device according to claim 1, wherein the core body main body part has a length such that the core body main body part does not protrude from the opening of the casing to outside while housed in the casing.

7. The position pointing device according to claim 1, wherein the leading end part and the pedestal part are joined to each other by welding.

8. The position pointing device according to claim 7, wherein the leading end part and the pedestal part are formed by two-color molding.

9. The position pointing device according to claim 8, wherein the two-color molding is performed by forming the pedestal part on the leading end part after the leading end part is formed.

10. The position pointing device according to claim 1, wherein the pedestal part and the core body main body part are joined to each other by welding.

11. The position pointing device according to claim 10, wherein the pedestal part and the core body main body part are formed by two-color molding.

12. The position pointing device according to claim 1, wherein the leading end part is formed from an elastomer, and
the pedestal part is formed from a resin.

13. The position pointing device according to claim 1, of an electromagnetic induction system such that a magnetic body with a coil wound therearound is provided inside the casing between the opening and the pressure detecting part,
wherein the magnetic body is provided therein with a penetration hole in which the core body main body part of the core body is inserted movably in the axial direction of the core body; and
the core body is disposed inside the casing, with the core body main body part inserted in the penetration hole of the magnetic body in a condition where the leading end part and the pedestal part are located on the side of the opening of the casing, so that a pressure applied to the leading end part is transmitted to the pressure detecting part.

14. The position pointing device according to claim 1, wherein the leading end part is provided with a projection on the pedestal part side, and the pedestal part is provided on the leading end part side with a recess corresponding to the projection of the leading end part.

15. The position pointing device according to claim 1, wherein the leading end part is provided with a recess on the pedestal part side, and the pedestal part is provided on the leading end part side with a projection corresponding to the recess of the leading end part.

16. The position pointing device according to claim 1, wherein the leading end part, the pedestal part, and the core body main body part are formed from a conductive resin.

17. A core body for a position pointing device comprising:
a leading end part formed from an elastic material;
a pedestal part which is formed from a material harder than the material of the leading end part and is positioned adjacent to the leading end part in an axial direction of the core body; and
a core body main body part which is positioned adjacent to the pedestal part in the axial direction of the core body and a thickness of the core body main part is smaller than a thickness of the pedestal part in a direction orthogonal to the axial direction of the core body,
wherein the core body is housed in a tubular casing of the position pointing device in a state of being movable in the axial direction of the core body, such that the leading end part is exposed to an exterior via an opening provided at one end portion in an axial direction of the casing, and that a pressure exerted on the leading end part in the axial direction of the core body is transmitted to a pressure detecting part which is provided inside the tubular casing and detects a pressure applied in the axial direction of the core body,
wherein the core body is disposed in a relation to the casing such that the leading end part is exposed by wholly protruding through the opening to the exterior and that a side surface of the pedestal part faces a surface of the opening of the casing, the side surface of the pedestal part and the surface of the opening of the casing extending in a direction along the axial direction of the core body.

18. The core body for a position pointing device according to claim 17,
wherein the pedestal part and the core body main body part are formed from a same material and integrally.

19. The core body for a position pointing device according to claim 17,
wherein the pedestal part and the core body main body part are formed from different materials.

20. The core body for a position pointing device according to claim 19, wherein the core body main body part is formed from a metal.

22. The core body for a position pointing device according to claim 20,
wherein the leading end part and the pedestal part are formed from a conductive resin.

22. The core body for a position pointing device according to claim 17,
wherein the leading end part, the pedestal part, and the core body main body part are formed from conductive resin.

* * * * *